(12) United States Patent
Lickfelt et al.

(10) Patent No.: US 10,246,930 B2
(45) Date of Patent: Apr. 2, 2019

(54) SYSTEM AND METHOD FOR REMOTELY CONTROLLING AND DETERMINING A STATUS OF A BARRIER

(71) Applicant: Honda Motor Co., Ltd., Tokyo (JP)

(72) Inventors: Brian K. Lickfelt, Powell, OH (US); Kevin Lamm, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/713,782

(22) Filed: Sep. 25, 2017

(65) Prior Publication Data

US 2019/0048647 A1    Feb. 14, 2019

Related U.S. Application Data

(60) Provisional application No. 62/542,755, filed on Aug. 8, 2017.

(51) Int. Cl.
| | |
|---|---|
| *E05F 15/77* | (2015.01) |
| *E05F 15/681* | (2015.01) |
| *G01S 19/14* | (2010.01) |
| *G07C 9/00* | (2006.01) |

(52) U.S. Cl.
CPC .......... *E05F 15/77* (2015.01); *E05F 15/681* (2015.01); *G01S 19/14* (2013.01); *E05Y 2900/106* (2013.01); *G07C 2009/00928* (2013.01); *G08C 2201/51* (2013.01)

(58) Field of Classification Search
CPC .. E05F 15/77; E05F 15/681; E05Y 2900/106; E05Y 2400/32; E05Y 2400/35; E05Y 2400/354; E05Y 2400/664; E05Y 2400/818; G01S 19/14; G07C 2009/00928; G08C 2201/51

USPC ........................................................ 340/5.71
See application file for complete search history.

(56) References Cited

U.S. PATENT DOCUMENTS

| | | |
|---|---|---|
| 5,625,980 A | 5/1997 | Teich et al. |
| 5,793,300 A | 8/1998 | Suman et al. |
| 5,900,806 A | 5/1999 | Issa et al. |
| 6,091,217 A | 7/2000 | Parsadayan |
| 6,091,330 A | 7/2000 | Swan et al. |
| 6,271,765 B1 * | 8/2001 | King ...................... G01C 21/26 340/10.1 |

(Continued)

OTHER PUBLICATIONS

Office Action of U.S. Appl. No. 15/803,293 dated Mar. 22, 2018, 48 pages.

(Continued)

*Primary Examiner* — Edwin C Holloway, III
(74) *Attorney, Agent, or Firm* — Rankin, Hill & Clark LLP

(57) ABSTRACT

A system and method for remotely controlling and determining a status of a barrier that include determining that a vehicle is parked at a predetermined vicinity of the barrier. The system and method also include sending at least one barrier control signal to remotely control movement of the barrier based on the initial state of the barrier. The system and method additionally include determining a current state of the barrier. The system and method further include presenting the current state of the barrier, wherein the current state of the barrier is presented to display if the current state of the barrier is a closed state based on the at least one barrier control signal sent to remotely control movement of the barrier.

20 Claims, 11 Drawing Sheets

(56) References Cited

U.S. PATENT DOCUMENTS

| | | |
|---|---|---|
| 6,400,956 B1 | 6/2002 | Richton |
| 6,469,464 B1 | 10/2002 | McCall |
| 6,476,732 B1 | 11/2002 | Stephan |
| 6,526,335 B1 | 2/2003 | Treyz et al. |
| 6,563,278 B2 | 5/2003 | Roman |
| 6,615,132 B1 | 9/2003 | Nagasaka et al. |
| 6,711,474 B1 | 3/2004 | Treyz et al. |
| 6,911,898 B2 | 6/2005 | Chung |
| 6,975,203 B2 | 12/2005 | Brookbank et al. |
| 7,039,391 B2 | 5/2006 | Rezvani et al. |
| 7,046,119 B2 | 5/2006 | Ghabra et al. |
| 7,068,163 B2 | 6/2006 | Sari et al. |
| 7,071,813 B2 | 7/2006 | Fitzgibbon |
| 7,088,265 B2 | 8/2006 | Tsui et al. |
| 7,127,847 B2 | 10/2006 | Fitzgibbon et al. |
| 7,170,248 B2 | 1/2007 | Tsui et al. |
| 7,170,426 B2 | 1/2007 | Tsui et al. |
| 7,183,933 B2 | 2/2007 | Dzurko et al. |
| 7,205,908 B2 | 4/2007 | Tsui et al. |
| 7,310,043 B2 | 12/2007 | Mamaloukas |
| 7,327,107 B2 | 2/2008 | Mullet et al. |
| 7,327,108 B2 | 2/2008 | Mullet et al. |
| 7,332,999 B2 | 2/2008 | Fitzgibbon |
| 7,342,368 B2 | 3/2008 | Roman |
| 7,358,480 B2 | 4/2008 | Mullet et al. |
| 7,545,833 B2 | 6/2009 | Chau et al. |
| 7,498,936 B2 | 9/2009 | Maeng |
| 7,602,283 B2 | 10/2009 | John |
| 7,609,146 B2 | 10/2009 | Tang et al. |
| 7,635,960 B2 | 12/2009 | Mullet et al. |
| 7,710,284 B2 | 5/2010 | Dzurko et al. |
| 7,733,218 B2 | 6/2010 | Drago et al. |
| 7,881,733 B2 | 2/2011 | Staton et al. |
| 7,911,358 B2 | 3/2011 | Bos et al. |
| 7,973,678 B2 | 7/2011 | Petricoin, Jr. et al. |
| 8,049,595 B2 | 11/2011 | Olson et al. |
| 8,058,970 B2 | 11/2011 | Mullet et al. |
| 8,068,006 B2 | 11/2011 | Martin |
| 8,111,997 B2 | 2/2012 | Butler |
| 8,115,616 B2 | 2/2012 | Gonzaga |
| 8,179,229 B2 | 5/2012 | Mullet |
| 8,244,448 B2 | 8/2012 | Newman |
| 8,279,040 B2 | 10/2012 | Laird |
| 8,291,642 B2 | 10/2012 | Jankovsky |
| 8,299,893 B2 | 10/2012 | Mullet |
| 8,330,572 B2 | 12/2012 | Rodriguez et al. |
| 8,400,264 B2 | 3/2013 | Mullet et al. |
| 8,531,266 B2 | 9/2013 | Shearer et al. |
| 8,577,392 B1 | 11/2013 | Pai et al. |
| 8,643,467 B2 | 2/2014 | Chutorash et al. |
| 8,653,962 B2 | 2/2014 | Maeng |
| 8,710,978 B2 | 4/2014 | Stählin et al. |
| 8,878,646 B2 | 11/2014 | Chutorash et al. |
| 8,922,356 B2 | 12/2014 | Lambert et al. |
| 8,994,496 B2 | 3/2015 | Freese et al. |
| 9,007,168 B2 | 4/2015 | Bos et al. |
| 9,129,502 B2 | 9/2015 | Naim et al. |
| 9,169,684 B2 | 10/2015 | Fan et al. |
| 9,189,952 B2 | 11/2015 | Chutorash et al. |
| 9,208,629 B2 | 12/2015 | Saladin et al. |
| 9,230,378 B2 | 1/2016 | Chutorash et al. |
| 9,264,673 B2 | 2/2016 | Chundrlik, Jr. et al. |
| 9,326,100 B2 | 4/2016 | Guo et al. |
| 9,412,264 B2 | 8/2016 | Geerlings et al. |
| 9,430,939 B2 | 8/2016 | Shearer et al. |
| 9,507,335 B2 | 11/2016 | Wilder et al. |
| 9,509,962 B2 | 11/2016 | Chundrlik, Jr. et al. |
| 9,539,930 B2 | 1/2017 | Geerlings |
| 9,542,834 B2 | 1/2017 | Geerlings et al. |
| 9,551,781 B2 | 1/2017 | Baxley et al. |
| 9,555,814 B2 | 1/2017 | Neubecker et al. |
| 9,556,812 B2 | 1/2017 | Ozkan |
| 9,581,456 B2 | 2/2017 | Liao et al. |
| 9,600,950 B2 | 3/2017 | Chutorash et al. |
| 9,620,005 B2 | 4/2017 | Geerlings et al. |
| 9,656,691 B2 | 5/2017 | Heimberger et al. |
| 9,672,670 B2 | 6/2017 | Menkveld |
| 9,879,466 B1 | 1/2018 | Yu |
| 2002/0002443 A1 | 1/2002 | Ames et al. |
| 2003/0102836 A1 | 6/2003 | McCall |
| 2003/0174045 A1 | 9/2003 | Zhang |
| 2003/0197594 A1 | 10/2003 | Olson et al. |
| 2003/0197595 A1 | 10/2003 | Olson et al. |
| 2003/0216139 A1 | 11/2003 | Olson et al. |
| 2005/0140321 A1 | 6/2005 | Wojciak, Jr. |
| 2005/0206497 A1 | 9/2005 | Tsui et al. |
| 2005/0212681 A1 | 9/2005 | Dzurko et al. |
| 2006/0071155 A1 | 4/2006 | Chen |
| 2006/0077035 A1* | 4/2006 | Mamaloukas ...... G07C 9/00309 340/5.61 |
| 2006/0157206 A1 | 7/2006 | Weik, III et al. |
| 2006/0158344 A1 | 7/2006 | Bambini et al. |
| 2006/0220834 A1* | 10/2006 | Maeng .................. G08B 21/24 340/539.1 |
| 2007/0046232 A1 | 3/2007 | Mullet et al. |
| 2007/0188120 A1 | 8/2007 | Mullet et al. |
| 2008/0061926 A1 | 3/2008 | Strait |
| 2008/0224819 A1 | 9/2008 | Callentine |
| 2009/0189779 A1 | 7/2009 | Gao |
| 2009/0269635 A1 | 10/2009 | Muramatsu |
| 2010/0127882 A1 | 5/2010 | Sitarski |
| 2010/0265034 A1 | 10/2010 | Cap et al. |
| 2011/0032115 A1 | 2/2011 | Kwiecinski et al. |
| 2011/0193700 A1 | 8/2011 | Fitzgibbon et al. |
| 2012/0265874 A1 | 10/2012 | Hoh et al. |
| 2013/0033359 A1 | 2/2013 | Ji et al. |
| 2013/0086841 A1 | 4/2013 | Luper et al. |
| 2013/0117078 A1 | 5/2013 | Weik, III et al. |
| 2013/0147600 A1 | 6/2013 | Murray |
| 2013/0147616 A1* | 6/2013 | Lambert ................ G07C 5/008 340/426.1 |
| 2014/0118111 A1 | 5/2014 | Saladin et al. |
| 2014/0167961 A1 | 6/2014 | Finlow-Bates |
| 2014/0266593 A1 | 9/2014 | Nye et al. |
| 2014/0320263 A1 | 10/2014 | Fan et al. |
| 2015/0002262 A1 | 1/2015 | Geerlings et al. |
| 2015/0084750 A1 | 3/2015 | Fitzgibbon |
| 2015/0084779 A1* | 3/2015 | Saladin ............... G07C 9/00896 340/686.6 |
| 2015/0137941 A1* | 5/2015 | Bauer ................. G07C 9/00007 340/5.61 |
| 2015/0148983 A1 | 5/2015 | Fitzgibbon |
| 2015/0235495 A1 | 8/2015 | Hall et al. |
| 2015/0266356 A1 | 9/2015 | Fischer et al. |
| 2015/0302672 A1 | 10/2015 | Kalsi et al. |
| 2015/0302735 A1 | 10/2015 | Geerlings et al. |
| 2015/0302736 A1 | 10/2015 | Geerlings et al. |
| 2015/0302737 A1 | 10/2015 | Geerlings et al. |
| 2015/0348344 A1 | 12/2015 | Rettig et al. |
| 2016/0018798 A1 | 1/2016 | Jiang et al. |
| 2016/0055742 A1 | 2/2016 | Wang et al. |
| 2016/0101736 A1 | 4/2016 | Geerlings et al. |
| 2016/0117879 A1 | 4/2016 | Chutorash et al. |
| 2016/0130853 A1 | 5/2016 | Tehranchi |
| 2016/0148451 A1 | 5/2016 | Menkveld |
| 2016/0300415 A1 | 10/2016 | Deneen et al. |
| 2016/0312517 A1 | 10/2016 | Elie et al. |
| 2016/0314362 A1 | 10/2016 | Elie et al. |
| 2016/0321914 A1 | 11/2016 | Geerlings et al. |
| 2016/0343233 A1 | 11/2016 | Wassef et al. |
| 2016/0375898 A1 | 12/2016 | Breuel et al. |
| 2017/0030737 A1 | 2/2017 | Elie et al. |
| 2017/0034485 A1 | 2/2017 | Scalisi |
| 2017/0106874 A1 | 4/2017 | Neubecker et al. |
| 2017/0108873 A1 | 4/2017 | Tanaka et al. |
| 2017/0114585 A1 | 4/2017 | Ozkan |
| 2017/0138111 A1 | 5/2017 | Lietz et al. |
| 2017/0140646 A1 | 5/2017 | Lu et al. |
| 2017/0147887 A1 | 5/2017 | Be et al. |
| 2017/0154482 A1 | 6/2017 | Osborne |
| 2017/0175433 A1 | 6/2017 | Kang et al. |

(56) References Cited

U.S. PATENT DOCUMENTS

2018/0194344 A1    7/2018   Wang et al.
2018/0216389 A1    8/2018   Tsui et al.

OTHER PUBLICATIONS

Office Action of U.S. Appl. No. 15/803,293 dated Jul. 9, 2019, 41 pages.
Notice of Allowance of U.S. Appl. No. 15/810,609 dated Jul. 11, 2018, 30 pages.
Office Action of U.S. Appl. No. 15/791,063 dated Oct. 30, 2018, 71 pages.
Office Action of U.S. Appl. No. 15/803,293 dated Nov. 29, 2018, 52 pages.
Office Action of U.S. Appl. No. 15/861,027 dated Dec. 14, 2018, 40 pages.
Office Action of U.S. Appl. No. 15/696,211 dated Jan. 2, 2019, 48 pages.
Office Action of U.S. Appl. No. 15/884,730 dated Jan. 10, 2019, 35 pages.

\* cited by examiner

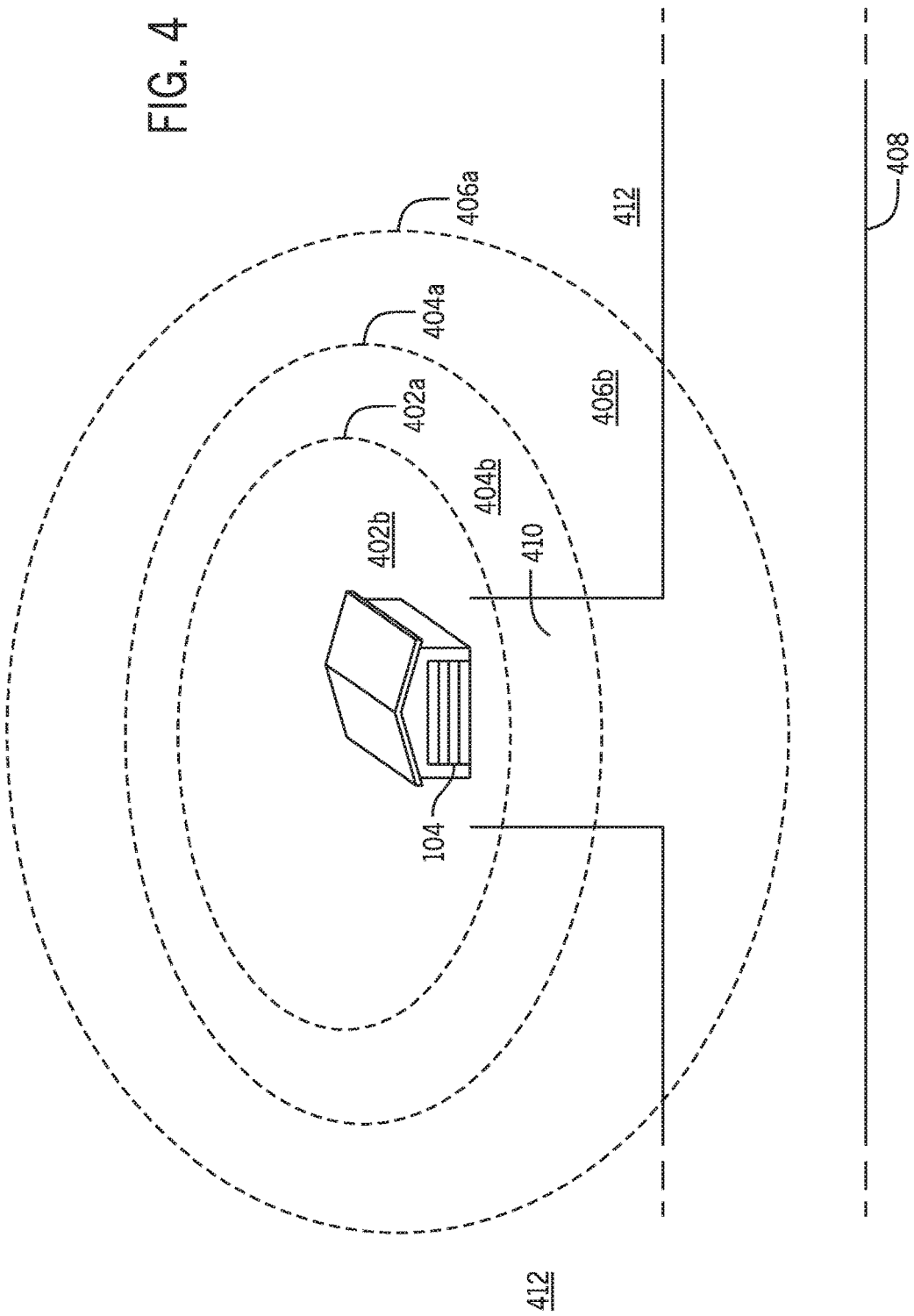

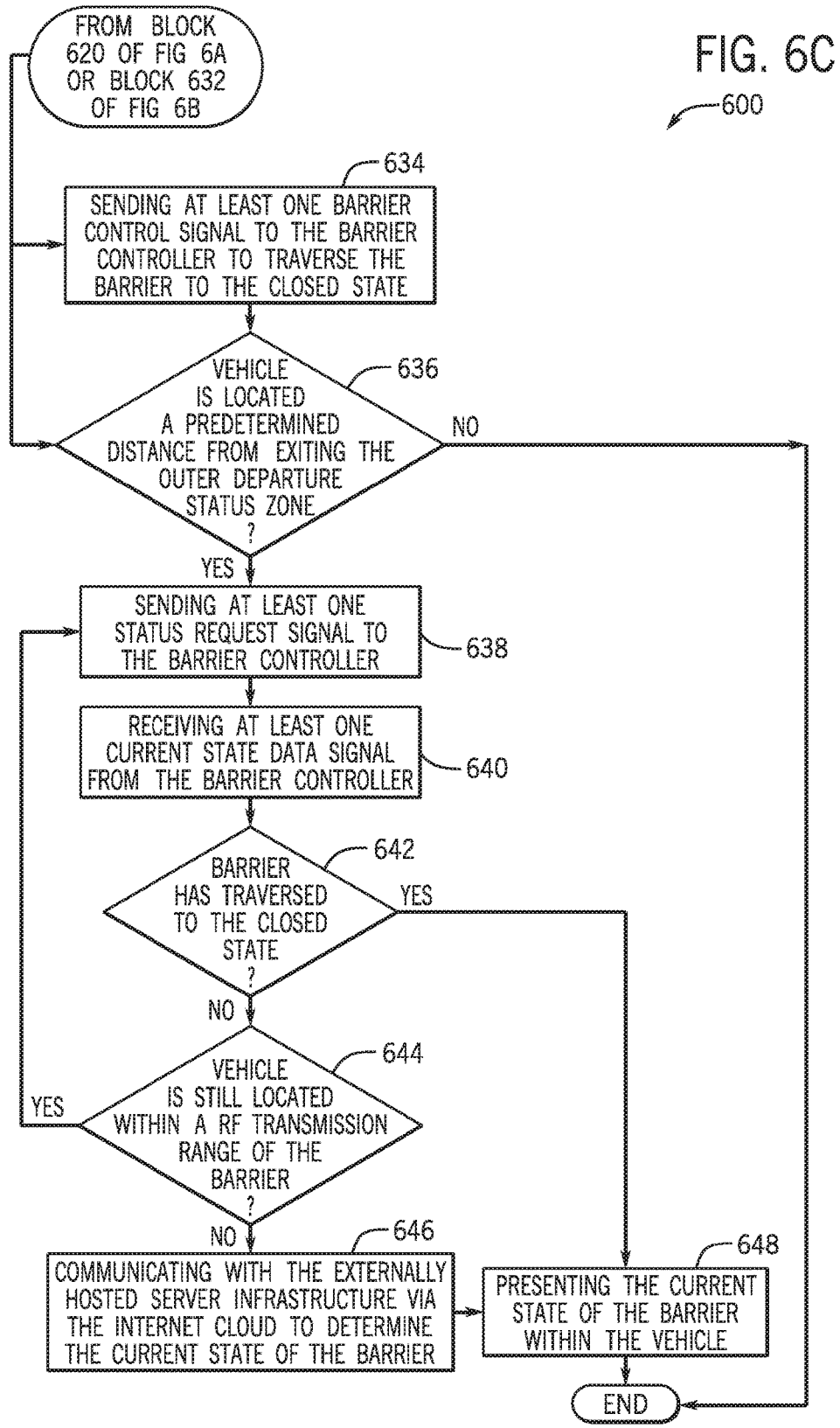

SYSTEM AND METHOD FOR REMOTELY CONTROLLING AND DETERMINING A STATUS OF A BARRIER

This application claims priority to U.S. Provisional Application Ser. No. 62/542,755 filed on Aug. 8, 2017, which is expressly incorporated herein by reference.

BACKGROUND

In many cases, movable barriers such as garage doors may need to be manually operated by a driver of a vehicle as the vehicle is arriving towards a barrier or departing away from the barrier. In some cases, when the vehicle is arriving towards the barrier the driver has to time when to manually actuate the opening of the barrier. As it may take a significant time to move the barrier from one state to another (e.g., closed to open), the driver may be forced to wait until the barrier is fully opened before parking the vehicle. In particular, the vehicle may arrive in front of the barrier with it having only partially completing its opening cycle. Consequently, the vehicle driver must completely stop the vehicle and wait for the movable barrier to completely open thereby wasting time and fuel/energy.

In some cases, as the vehicle departs away from the barrier, an infotainment system of the vehicle may be utilized to send one or more signals to close the barrier. A scenario may exist where the vehicle may be driven at a high rate of speed and may be driven out of a RF communication range between the vehicle and a barrier controller before the infotainment system is fully booted up to send the one or more RF communication signals to the barrier controller. In many cases, the driver may not be fully aware that the one or more RF communication signals are not able to be communicated before the vehicle exits the RF communication range. Consequently, the driver may not be aware that the barrier may not have been closed as the vehicle is driven away from the barrier. For example, the vehicle may be driven away from the driver's home at a high rate of speed outside of a RF communication range thereby nullifying the sending of a RF communication signal to close the barrier and the barrier may still be open unbeknownst to the driver of the vehicle.

In additional cases, the driver may provide an input to manually close the barrier as the vehicle is quickly driven away from the location at which the barrier is located. Consequently, there is a risk that a signal sent to close the barrier never reaches a controller associated with the barrier. For example, the vehicle may be driven away from the home location at a high rate of speed outside of a range capable of sending a movable barrier signal to close the barrier when the driver provides the input to manually close the barrier. In many cases, it may be undesirable for the driver to estimate at which point the vehicle is within a range to send the movable barrier signal to open or close the movable barrier as the vehicle is arriving towards or departing away from the barrier.

BRIEF DESCRIPTION

According to one aspect, a computer-implemented method for automatically controlling movement of a barrier that includes determining that a vehicle is parked at a predetermined vicinity of the barrier. An initial state of the barrier is determined upon determining that the vehicle is parked at the predetermined vicinity of the barrier. The method also includes sending at least one barrier control signal to remotely control movement of the barrier based on the initial state of the barrier. The at least one barrier control signal is sent to a barrier controller associated with the barrier to traverse the barrier to a closed state when it is determined that the initial state of the barrier is an opened state or a partially opened state. The method additionally includes determining a current state of the barrier. The current state of the barrier is determined based on at least one: RF communication that occurs immediately prior to the vehicle being located outside of a RF communication range with the barrier controller, and a wireless internet communication that occurs upon the vehicle being located outside of the RF communication range with the barrier controller. The method further includes presenting the current state of the barrier. The current state of the barrier is presented to display if the current state of the barrier is the closed state based on the at least one barrier control signal sent to remotely control movement of the barrier.

According to another aspect, a system for remotely controlling and determining a status of a barrier that includes a memory storing instructions when executed by a processor cause the processor to determine that a vehicle is parked at a predetermined vicinity of the barrier. An initial state of the barrier is determined upon determining that the vehicle is parked at the predetermined vicinity of the barrier. The instructions also cause the processor to send at least one barrier control signal to remotely control movement of the barrier based on the initial state of the barrier. The at least one barrier control signal is sent to a barrier controller associated with the barrier to traverse the barrier to a closed state when it is determined that the initial state of the barrier is an opened state or a partially opened state. The instructions additionally cause the processor to determine a current state of the barrier. The current state of the barrier is determined based on at least one: RF communication that occurs immediately prior to the vehicle being located outside of a RF communication range with the barrier controller, and a wireless internet communication that occurs upon the vehicle being located outside of the RF communication range with the barrier controller. The instructions further cause the processor to present the current state of the barrier. The current state of the barrier is presented to display if the current state of the barrier is the closed state based on the at least one barrier control signal sent to remotely control movement of the barrier.

According to still another aspect, a computer readable storage medium storing instructions that when executed by a computer, which includes at least a processor, causes the computer to perform a method that includes determining that a vehicle is parked at a predetermined vicinity of a barrier. An initial state of the barrier is determined upon determining that the vehicle is parked at the predetermined vicinity of the barrier. The instructions also include sending at least one barrier control signal to remotely control movement of the barrier based on the initial state of the barrier. The at least one barrier control signal is sent to a barrier controller associated with the barrier to traverse the barrier to a closed state when it is determined that the initial state of the barrier is an opened state or a partially opened state. The instructions additionally include determining a current state of the barrier. The current state of the barrier is determined based on at least one: RF communication that occurs immediately prior to the vehicle being located outside of a RF communication range with the barrier controller, and a wireless internet communication that occurs upon the vehicle being located outside of the RF communication range with the barrier controller. The instructions further include presenting the current state of the barrier. The current state of the barrier is presented to display if the current state of the barrier is the closed state based on the at least one barrier control signal sent to remotely control movement of the barrier.

BRIEF DESCRIPTION OF THE DRAWINGS

FIG. 4 is an illustrative example of a plurality of zones associated with the barrier that may be applied when the vehicle is determined to be departing away from the barrier according to an exemplary embodiment;

FIG. 6C is process flow diagram of a third part of the method for automatically controlling movement of the barrier during a departure of the vehicle away from the barrier according to an exemplary embodiment;

DETAILED DESCRIPTION

Figure 1:
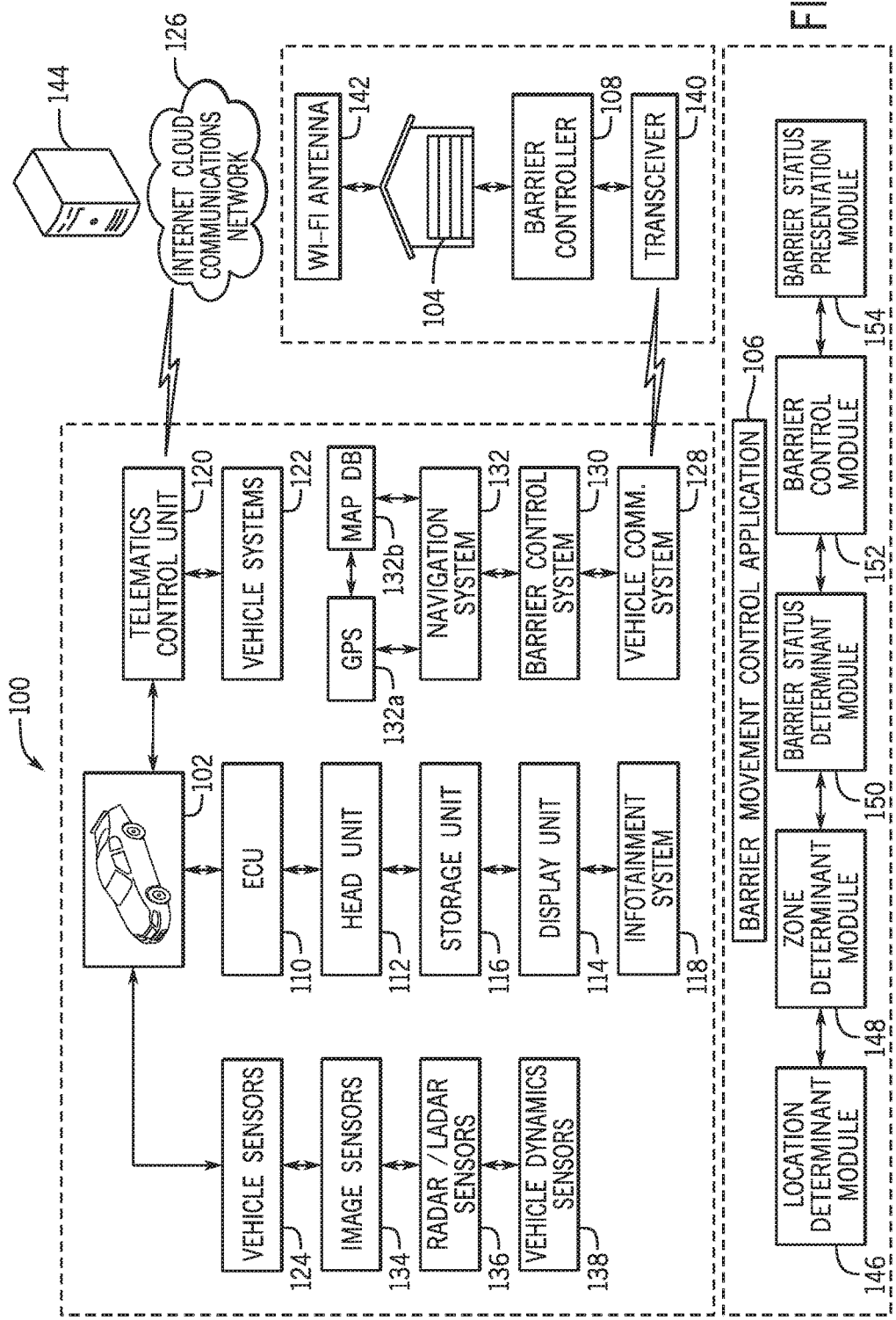
FIG. 1 is a schematic view of an operating environment for implementing systems and methods within a vehicle for automatically controlling movement of a movable barrier according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods within a vehicle 102 for remotely controlling and determining a status of a barrier 104 (e.g., a garage door, an entry/exit gate) according to an exemplary embodiment. The components of the environment 100, as well as the components of other systems, hardware architectures, and software architectures discussed herein, can be combined, omitted, or organized into different architectures for various embodiments.

Generally, the environment includes a barrier remote control and status update application (barrier control application) 106 that is executed to remotely determine a current state of the barrier 104 and remotely control the movement of the barrier 104. The remote control of the movement of the barrier 104 may be completed based on a current state (e.g., opened state or closed state) of the barrier 104 from a vehicle 102, a current location of the vehicle 102, and/or a traveling direction of the vehicle 102. More specifically, the barrier control application 106 may determine the (traveling or parking) location of the vehicle 102, if the vehicle 102 is either arriving towards a location at which the barrier 104 is located (arriving towards the barrier 104) or departing away from the location at which the barrier 104 is located (departing away from the barrier 104), and the like.

As discussed in much detail below, the barrier control application 106 may be used to determine one or more zones associated with the barrier 104 that may be applied by the application 106 to send one or more types of signals to a barrier controller 108 based on one or more factors. The one or more types of signals may be used to determine a current state of the barrier 104, to send a command to traverse the barrier to the opened state (e.g., to fully open the barrier 104), to send a command to traverse the barrier 104 to the closed state (e.g., to fully close the barrier 104). As discussed below, the signals may be sent (e.g., transmitted) based on the current status of the barrier 104, the location of the vehicle 102, and/or the traveling direction of the vehicle 102.

As discussed in more detail below, the barrier control application 106 may present a barrier status notification user interface (barrier status user interface) (illustrated in FIG. 7) that may provide a user (e.g., driver of the vehicle 102) with a current status of the barrier 104 as the vehicle 102 is arriving towards the barrier 104, located within the area enclosed by the barrier 104, and departing away from the barrier 104. The barrier status user interface may present the current status of the barrier 104 as an opened state, a partially opened state, or a closed state.

More specifically, the barrier status user interface may present the current state of the barrier 104 as the opened state when the barrier 104 is stationary and within a fully opened state. Likewise, the barrier status user interface may present the current state of the barrier 104 as the closed state when the barrier 104 is stationary and within a fully closed state. Additionally, the barrier status user interface may present the real time status of the barrier 104 as the partially opened state that may indicate an opening level (e.g., percentage) of the barrier 104 as it is stationary or in movement to complete the process of being opened or closed. The barrier interface may also be used to provide the user with a current status of the barrier 104 as a follow-up after a command signal is sent to actuate movement of the barrier 104 (e.g., to traverse the barrier 104 from the opened state to the closed state, the closed state to the opened state, the partially opened state to the opened state, the partially opened state to the closed state).

In the illustrated embodiment of FIG. 1, the vehicle 102 may include a plurality of components that may be operably connected for computing communication via a bus (not shown) (e.g., a Controller Area Network (CAN) or a Local Interconnect Network (LIN) protocol bus), an input/output interface (I/O interface) and/or other wired and wireless technologies. The plurality of components of the vehicle 102 may generally include an electronic control unit (ECU) 110, a head unit 112, a display unit 114, a storage unit 116, and a telematics control unit (TCU) 120. Additionally, the plurality of components of the vehicle 102 may also include a plurality of vehicle systems 122 and a plurality of vehicle sensors 124 that will be discussed in more detail below.

In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the environment 100. In one embodiment, the ECU 110 may execute one or more operating systems, applications, and/or interfaces that are associated to the vehicle 102 and/or the plurality of vehicle systems 122. In particular, the ECU 110 may execute the barrier control application 106 to send commands to the components of the vehicle 102 and/or to components external to the vehicle 102 that include but are not limited to the barrier controller 108 operably connected to the barrier 104.

The ECU 110 may also be operably connected for computer communication to the head unit 112. The head unit 112 may include internal processing memory, an interface circuit, and bus lines (components of the head unit not shown) for transferring data, sending commands, and communicating with the components of the vehicle 102. In one or more embodiments, the ECU 110 may execute one or more operating systems, applications, and/or interfaces that are associated to the vehicle 102 and/or the plurality of vehicle systems 122.

In one embodiment, the head unit 112 may be connected to an infotainment system 118. The infotainment system 118 may act as an information hub of the vehicle 102 that presents and delivers information to the user (e.g. audio, video, HVAC, barrier controls, etc.). In one embodiment, the infotainment system 118 may be operably connected to a barrier control system 130 of the vehicle 102 to send and receive data signals that may be utilized to remotely control the barrier 104. The infotainment system 118 may also be utilized to provide the barrier status user interface to the user through a display unit 114 operably connected to the infotainment system 118.

In one embodiment, the barrier control application 106 may ensure that remotely controlling the movement of the barrier 104 and remotely determining the status of the barrier 104 are not dependent on the operation of the infotainment system 118 since the infotainment system 118 may require a sufficient amount of time to fully boot up. In other words, the application 106 may alleviate a potential issue that may occur when the vehicle 102 is quickly driven out of a radio frequency (RF) signal transmission range with the components of the barrier 104 prior to the full boot up of the infotainment system 118.

The display unit 114 may be disposed within a center stack area of the vehicle 102. Based on the operation of the infotainment system 118, the display unit 114 may display one or more vehicle human machine interfaces (vehicle HMI) to provide the driver of the vehicle 102 with various types of information and/or to receive one or more inputs from the driver of the vehicle 102. More specifically, the vehicle HMI may pertain to one or more operating systems, vehicle system interfaces, and application interfaces, including interfaces pertaining to the barrier control application 106. For example, the vehicle HMI may present one or more user interfaces of the barrier control application 106 including a barrier configuration user interface (not shown) and the barrier status user interface. In one or more embodiments, the infotainment system 118 may communicate with one or more additional display units (not shown) within the vehicle 102 that may include, but may not be limited to, a meter display and a head up display that may additionally or alternatively present the vehicle HMI.

In one embodiment, the head unit 112 may be operably connected to one or more notification devices (not shown) within the vehicle 102. More particularly, the head unit 112 may communicate with one or more haptic devices (not shown) (e.g., haptic steering wheel, haptic seats, haptic gear shifter) audio devices (not shown) (e.g., audio system, speakers), etc. that may also be used to provide the current state of the barrier 104 to the user in addition to or in lieu of the barrier status user interface. In other words, the head unit 112 may provide such notifications independent of the operation of the infotainment system 118.

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110, the head unit 112, and the plurality of vehicle systems 122. The storage unit 116 may include one or more barrier profiles that are respectively associated to one or more barriers based on user inputs. As discussed in more detail below, the barrier profile(s) may be created, populated and/or updated by the barrier control application 106.

In one embodiment, the barrier profile may include details that are associated with the barrier 104 as identified by the user. The details may include a name assigned to the barrier 104 by the user (e.g., primary garage door), a geo-location associated with the barrier 104 (e.g., GPS, DGPS coordinates of the location of the barrier 104), and a plurality of global positioning coordinates associated with respective boundaries of one or more zones associated with the barrier 104 that are utilized by the application 106. As discussed in more detail below, the barrier profile(s) may be created, populated, updated, and/or evaluated to retrieve data based on the execution of the barrier control application 106.

In one embodiment, the TCU 120 of the vehicle 102 may be utilized as an external interface for wireless internet communication (e.g., mobile communication) between the vehicle 102 and an internet cloud communication network (internet cloud) 126 to send and retrieve data stored on one or more external devices. In one embodiment, the one or more external devices may include an external server infrastructure 144 that is accessible to provide data to the TCU 120.

In an exemplary embodiment, the TCU 120 may be configured to connect to a GSM, GPRS, Wi-Fi, WiMax, or LTE wireless connection to send and receive one or more data files through the internet cloud 126 to/from the external server infrastructure 144. The TCU 120 may also include a microcontroller (not shown) that controls the processes of the TCU 120 and a storage (not shown) that may include various types of memory to temporarily store data that are provided to/from the components of the vehicle 102. In one embodiment, the barrier control application 106 may utilize the TCU 120 to communicate with the internet cloud 126 to access the external server infrastructure 144 to determine a current status of the barrier 104 as communicated by the barrier controller 108 and stored on the external server infrastructure 144.

In one embodiment, the external server infrastructure 144 may include a plurality of interconnected servers that support and maintain data that can be sent to the TCU 120 and may be further utilized by one or more components of the vehicle 102. The external server infrastructure 144 may include, but is not limited to, web servers, data servers, database servers, domain controllers, backup servers, and the like. In an exemplary embodiment, the external server infrastructure 144 may include a barrier controller data repository (not shown) that includes the current status of the barrier 104 that may be used by the application 106. In one embodiment, upon controlling the movement of the barrier 104 and changing the status of the barrier 104 (e.g., from the opened state to the closed state), the barrier controller 108 may access the internet cloud 126 (e.g., through a Wi-Fi connection) to update and store an (updated) current status of the barrier 104.

Referring again to the vehicle 102, in addition to the infotainment system 118, the plurality of vehicle systems 122 may include, but may not be limited to, a vehicle communication system 128, the barrier control system 130, and a navigation system 132. In one embodiment, the vehicle communication system 128 may include one or more transceivers that are capable of providing wireless computer communications utilizing various protocols to be utilized to send/receive electronic signals internally to components and systems within the vehicle 102 and to external devices including a transceiver 140 operably connected to a barrier controller 108 associated with the barrier 104.

The vehicle communication system 128 may be capable of providing wired or wireless computer communications utilizing various protocols to send/receive non-transitory signals internally to the plurality of components of the vehicle 102 and/or externally to external devices. Generally, these protocols include a wireless system (e.g., IEEE 802.11 (WiFi), IEEE 802.15.1 (Bluetooth)), a near field communication system (NFC) (e.g., ISO 13157), a local area network (LAN), and/or a point-to-point system. More particularly, the vehicle communication system 128 may be utilized by the barrier control application 106 to send (i.e., transmit) one or more radio frequency (RF) signals in one or more frequencies and/or radio bands to communicate commands and data to the barrier controller 108 through the transceiver 140.

In one embodiment, vehicle communication system 128 may utilize RF communication to communicate the one or more command signals that include but are not limited to, at least one barrier status request signal and/or at least one barrier control signal to the transceiver 140 based on the execution of the application 106. In particular, the barrier control application 106 may utilize the vehicle communication system 128 to send the one or more RF communication status request signals to be evaluated by the barrier controller 108. Upon evaluating the barrier status request signal(s), the barrier controller 108 may determine the current state of the barrier 104 as the opened state, the partially opened state, or the closed state. The barrier control application 106 may further utilize the vehicle communication system 128 to send the one or more barrier control signals to remotely control movement of the barrier 104 (e.g., actuate movement of the barrier 104 to open or close the barrier 104) based on the determination of the current state of the barrier 104, as determined and provided by the barrier controller 108.

As discussed in more detail below, the vehicle communication system 128 may be additionally utilized to receive one or more response RF communication data signals sent from the transceiver 140 including, but not limited to, at least one barrier status signal that are initiated by the barrier controller 108 to be interpreted by the barrier control application 106. The barrier control signal(s) may be sent to open or close the barrier 104 based on the evaluation of the at least one barrier status signal to determine the current status of the barrier 104. Additionally, the barrier control signal(s) may be sent to open or close the barrier 104 based on the determination as to the arrival of the vehicle 102 towards the barrier 104, the departure of the vehicle 102 away from the barrier 104, or the location of the vehicle 102 within the area enclosed by the barrier 104.

In one embodiment, the barrier control system 130 of the vehicle 102 may be utilized to provide manual or automatic commands to the vehicle communication system 128 through the infotainment system 118. In particular, the barrier control system 130 may utilize the vehicle communication system 128 to send the one or more barrier control signals to actuate movement of the barrier 104 to open or close the barrier 104 based on one or more user inputs. In one configuration, the barrier control system 130 may be included as part of a HOMELINK® trainable garage door opening device (or other embedded, integrated accessory of the vehicle 102) that is integrated within a ceiling panel (not shown) or rearview mirror (not shown) of the vehicle 102. In some configurations, the barrier control system 130 may include one or more input buttons (not shown) that may be inputted by the user to actuate movement of the barrier 104.

In an exemplary embodiment, the navigation system 132 may be connected to the head unit 112, the infotainment system 118, and the display unit 114 to provide a map user interface (not shown) to the driver of the vehicle 102. The navigation system 132 may include a global position system 132a (GPS) that may also be used to localize (i.e., determine the GPS or DGPS coordinates) the vehicle 102. The navigation system 132 may include its own processor and memory that communicate with the GPS 132a to determine and provide route guidance to the driver of the vehicle 102.

In one or more embodiments, the navigation system 132 may include and/or connect to and access a map database 132b to present one or more details and graphics on the map user interface through the display unit 114. The map database 132b may include geographical maps of one or more locations (e.g., countries, regions, cities) in which the vehicle 102 may be driven. The map database 132b may also include locational data that pertains to the barrier 104. In one embodiment, the barrier control application 106 may utilize the navigation system 132 to localize the barrier 104 and to determine a plurality of global positioning coordinates associated with one or more areas that are located within the surrounding area of the barrier 104. The plurality of global positioning coordinates associated with the one or more areas may constitute boundaries of the one or more zones associated with the barrier 104.

Referring now in more detail to the plurality of vehicle sensors 124, the plurality of vehicle sensors 124 may include the image sensors 134, RADAR/LADAR sensors 136, and vehicle dynamics sensors 138. In one embodiment, the image sensors 134 may include one or more external or internal cameras that may include, but may not be limited to, an infrared camera, a digital camera, a video camera (camera types not individually shown), and the like that may be mounted at one or more areas outside of and/or inside of the vehicle 102. For example, the image sensors 134 may include one or more infrared cameras (not shown) that may be mounted on one or more bumpers (not shown), a dashboard (not shown), the ceiling panel of the vehicle 102, and/or side panels of the vehicle 102. In one or more embodiments, the image sensors 134 may provide a sequence of images/video that may pertain to an exterior environment of the vehicle 102. In one embodiment, the barrier control application 106 may communicate with the image sensors 134 to determine the current status of the barrier 104 or the movement of the barrier 104 when the vehicle 102 is within a sensing distance of the barrier 104.

The RADAR/LADAR sensors 136 of the plurality of vehicle sensors 124 may include, but may not be limited to, a millimeter wave radar, a laser detection and range sensor, an infrared sensor, a thermal sensor, and the like. Various alternate or additional hardware devices will be apparent for inclusion as the RADAR/LADAR sensors 136. The RADAR/LADAR sensors 136 may be disposed at one or more areas of the vehicle 102 that may include a front bumper, door panels, vehicle mirrors, a rear bumper, a roof, a floorboard, (areas of the vehicle 102 not individually shown) and the like. In one embodiment, the RADAR/LADAR sensors 136 may provide the barrier control application 106 with data that pertains to the current status of the barrier 104 or the movement of the barrier 104 when the vehicle 102 is located within the sensing distance of the barrier 104.

In one or more embodiments, the vehicle dynamics sensors 138 may communicate with one or more components of the vehicle 102 that may include the ECU 110, an engine (not shown), a transmission (not shown), brakes (not shown), the plurality of vehicle systems 122, and the like to determine vehicle dynamics information. The vehicle dynamics information may be evaluated by the barrier control application 106 to evaluate vehicle engine operation, vehicle speed, vehicle braking, vehicle steering, engine RPM, etc.

With particular reference to the barrier 104, in one or more embodiments, the barrier 104 may include a garage door, a gate (e.g., one or more gate doorways), a door (e.g., a residential door), etc. The barrier 104 may be connected to and controlled by the barrier controller 108. The barrier controller 108 may include internal processing memory, an interface circuit, and bus lines for transferring data, sending commands, and communicating with the components associated with and/or connected to the barrier 104. In one embodiment, the barrier controller 108 may be connected to a remote control (e.g., garage door remote) (not shown) and an interface device (e.g., wall inputs, numeric key pad) (not shown) that may be used by the user to provide one or more inputs to control movement of the barrier 104.

As discussed above, the barrier controller 108 may be operably connected to the transceiver 140. The barrier controller 108 may be configured to control operation of the transceiver 140 to receive the one or more command signals from the vehicle communication system 128. Additionally, the barrier controller 108 may be configured to control operation of the transceiver 140 to send (e.g., transmit) one or more response signals to the vehicle communication system 128. In particular, the barrier controller 108 may evaluate the one or more data signals received by the transceiver 140 and may instruct the transceiver 140 to send the one or more response data signals.

In an exemplary embodiment, the barrier controller 108 may also be operably connected to a Wi-Fi antenna 142. The Wi-Fi antenna 142 may be utilized as an external interface for mobile communication between the barrier controller 108 and the internet cloud 126 to send and retrieve data stored on the external server infrastructure 144 and to store data within the barrier controller data repository. In an exemplary embodiment, the Wi-Fi antenna 142 may be configured to connect to Wi-Fi, WiMax, GSM, GPRS, or LTE wireless connection to send and receive one or more data files through the internet cloud 126 to/from the external server infrastructure 144.

In one embodiment, the barrier controller 108 may send a command to the Wi-Fi antenna 142 to communicate with the internet cloud 126 to access the external server infrastructure 144 to store the current status of the barrier 104 as determined by the barrier controller 108. As discussed below, when the vehicle 102 is outside of an RF transmission range of the barrier 104, the barrier control application 106 may utilize the TCU 120 to communicate with the external server infrastructure 144 via the internet cloud 126 to access the barrier controller data repository to retrieve the stored current status of the barrier 104.

Figure 2:
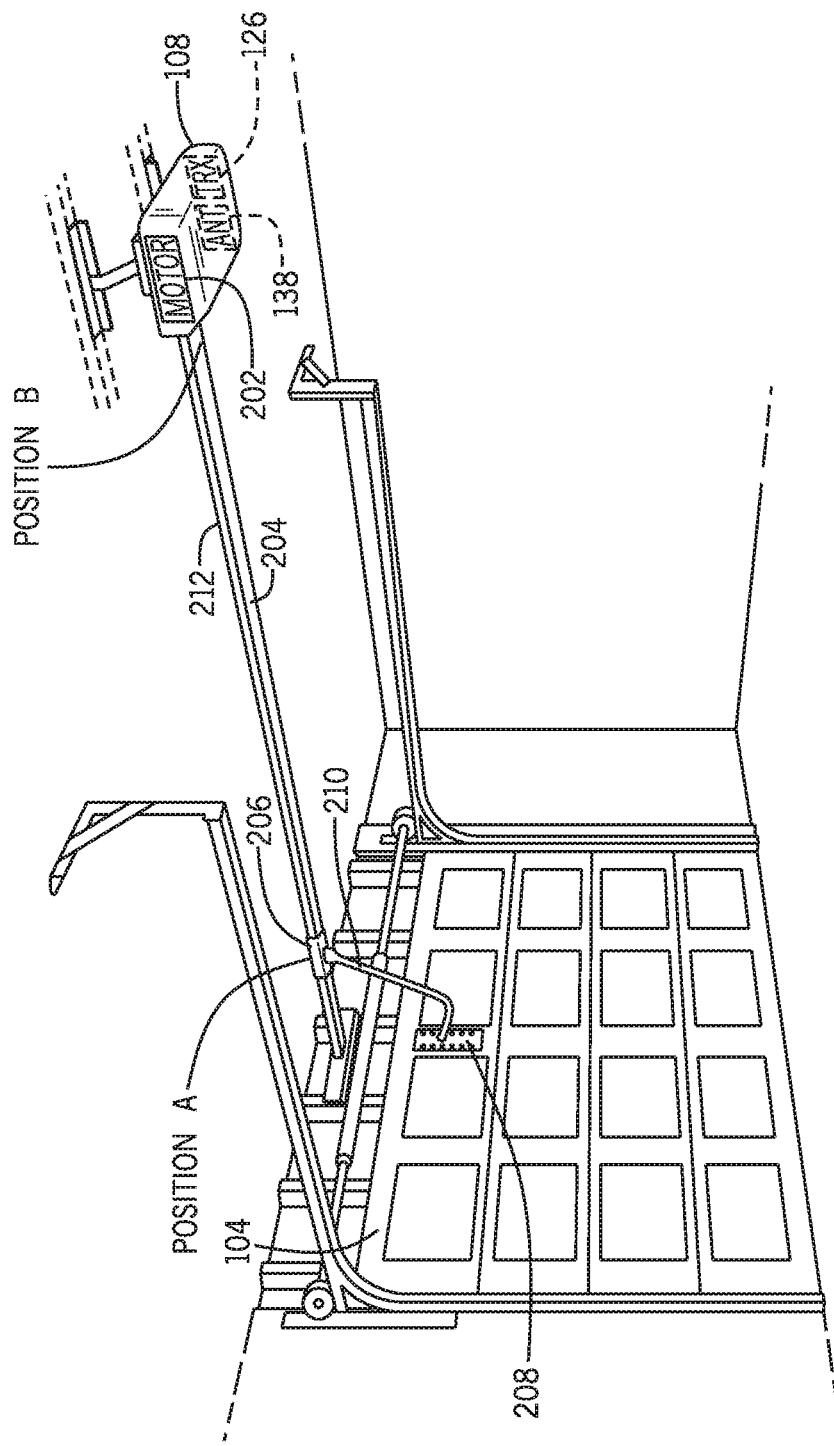
FIG. 2 is an illustrative example of the barrier that is configured as a garage door and a barrier controller that is configured as a garage door opener according to an exemplary embodiment.

FIG. 2 is an illustrative example of the barrier 104 that is configured as a garage door and the barrier controller 108 that is configured as a garage door opener according to an exemplary embodiment. The barrier controller 108 may include a motor 202 that is operably connected to a cable 204. The cable 204 may be further connected to a trolley/pulley 206. As shown, the trolley/pulley 206 may be connected to the barrier 104 by a connector 208 that connects to the trolley/pulley 206 by an arm 210. The operation of the motor 202 may move the cable 204 across a track 212 such that the trolley/pulley 206 may be traversed from a first position, designated as 'Position A', wherein the barrier 104 is in the closed state, to a second position, designated as 'Position B', wherein the barrier 104 is in the opened state. In other words, based on the operation of the motor 202, the barrier 104 may be traversed from the closed position to the opened position, wherein the trolley/pulley 206 is traversed from 'Position A' to 'Position B'. Similarly, based on the operation of the motor 202, the barrier 104 may be traversed from the opened position to the closed position, wherein the trolley/pulley 206 is traversed from 'Position B' to 'Position A'.

In an exemplary embodiment, the barrier controller 108 may utilize the transceiver 140 and the Wi-Fi antenna 142 to send the one or more current state data signals as the motor 202 is moving the cable 204 to traverse the trolley/pulley 206 from the first position to the second position and/or from the second position to the first position. The one or more current state data signals may each include the respective barrier traversing level that indicates the opening/closing level of the barrier 104. The barrier traversing level may be representative of the position of the cable 204 as its being moved by the operation of the motor 202 and/or the position of the trolley/pulley 206 as its being moved across the track 212 based on the movement of the cable 204.

In one embodiment, as the motor 202 is operated to move the cable 204 to traverse the trolley/pulley 206, the transceiver 140 may send the one or more current state data signals at a predetermined frequency to the vehicle communication system 128. Additionally, the Wi-Fi antenna 142 may communicate the one or more current state data signals to the external server infrastructure 144 via the internet cloud 126 at a predetermined frequency. More specifically, the transceiver 140 and the Wi-Fi antenna 142 may send the current state data signal(s) upon the starting point of the movement of the cable 204 when the barrier 104 starts traversing across the track 212 to an ending point of the movement of the cable 204 when the barrier 104 completes traversing across the track 212.

In an exemplary embodiment, upon the barrier controller 108 completing the movement of the barrier 104 to traverse the barrier 104 from the closed state to the opened state, wherein the trolley/pulley 206 is traversed from 'Position A' to 'Position B', the barrier controller 108 may utilize the transceiver 140 to send the current state data signal(s) to communicate the current status of the barrier as the opened state to the vehicle communication system 128 (when the vehicle 102 is within at least one zone associated with the barrier 104). The barrier controller 108 may also utilize the Wi-Fi antenna 142 to communicate the current status of the barrier as the opened state to the external server infrastructure 144 to store the current status of the barrier 104 to be accessed (when the vehicle 102 is not within the RF transmission range of the barrier 104). Similarly, upon the barrier controller 108 completing the movement of the barrier 104 to traverse the barrier 104 from the opened state to the closed state, wherein the trolley/pulley 206 is traversed from 'Position B' to 'Position A', the barrier controller 108 may utilize the transceiver 140 to send the current state data signal(s) to communicate the current status of the barrier 104 as the closed state to the vehicle communication system 128. The barrier controller 108 may also utilize the Wi-Fi antenna 142 to communicate the current status of the barrier 104 as the closed state to the external server infrastructure 144 to store the current status of the barrier 104 to be accessed.

It is to be appreciated that the functionality of the barrier controller 108 and its components including the motor 202 may be applied to alternate configurations of the barrier 104 including alternate garage door and component configurations and other types of barriers that may not include the garage door. In one exemplary configuration, the barrier 104 may be configured as a two-door gate (not shown) that may include latches that are operably connected to one or more motors (not shown) of the barrier controller 108. In this exemplary configuration, the one or more current state data signals may be indicative of the movement of the latches by the one or more motors to traverse the barrier 104 to the opened state or the closed state.

As discussed in detail below, the barrier control application 106 may utilize the vehicle communication system 128 to directly communicate with the barrier controller 108 through the transceiver 140 to send the one or more status request signals and receive the one or more current state data signals to determine the current status of the barrier 104 when the vehicle 102 is determined to be within at least one zone associated with the barrier 104. Additionally, the barrier control application 106 may utilize the TCU 120 to communicate with the external server infrastructure 144 via the internet cloud to query the barrier controller data repository and determine the current status of the barrier 104 when the vehicle 102 is determined to be outside of the at least one zone associated with the barrier 104 (i.e., outside of the RF transmission range between the vehicle communication system 128 and the transceiver 140).

The Barrier Movement Control Application and Related Methods

The components of the barrier control application 106 will now be described according to an exemplary embodiment and with reference to FIG. 1. In an exemplary embodiment, the barrier control application 106 may be stored on the storage unit 116 of the vehicle 102. In alternate embodiments, the barrier control application 106 may be stored on the external server infrastructure 144 and may be accessed by the TCU 120 to be executed by the ECU 110 and/or the head unit 112 of the vehicle 102. As stated above, the barrier control application 106 may be executed when the door(s) (not shown) of the vehicle 102 is opened when the vehicle engine (not shown) is disabled (e.g., turned OFF) or when a battery/accessory state of the vehicle 102 is enabled. Therefore, the vehicle 102 (e.g., engine) does not have to be fully enabled for the ECU 110 or the head unit 112 to execute the barrier control application 106.

In an exemplary embodiment, the barrier control application 106 may include a location determinant module 146, a zone determinant module 148, a barrier status determinant module 150, a barrier control module 152, and a barrier status presentation module 154. It is to be appreciated that the barrier control application 106 may include additional modules and/or sub-modules that are configured to execute one or more functions of the application 106. As will be described in more detail below, the location determinant module 146 may be utilized to determine the location of the vehicle 102 with respect to the (location of) the barrier 104. The zone determinant module 148 may determine a plurality of zones that are utilized to send one or more signals between the vehicle communication system 128 and the transceiver 140. Additionally, the barrier control module 152 may be utilized to remotely control the movement of the barrier 104 to traverse the barrier 104 to the opened state, the closed state, or the partially opened state. Further, the barrier status presentation module 154 may be utilized to communicate with the infotainment system 118 to present the barrier status user interface to provide the current status of the barrier 104 to the user within the vehicle 102.

As discussed, the user may create the barrier profile associated with the barrier 104. In one embodiment, upon creation of the barrier profile, the location determinant module 146 may communicate with the navigation system 132 of the vehicle 102 to determine the geo-location associated with the barrier 104. As discussed below, the geo-location associated with the barrier 104 may be used to determine if the vehicle 102 is being driven and is arriving towards the barrier 104 (i.e., the geo-location associated with the barrier 104). The geo-location associated with the barrier 104 may also be used to determine if the vehicle 102 is being driven and is departing away from the barrier 104 (i.e., the geo-location associated with the barrier 104). In some embodiments, the geo-location associated with the barrier 104 may additionally be used to determine if the vehicle 102 is located (e.g., parked) within a predetermined distance of the barrier 104 that may include the area enclosed by the barrier 104.

In one embodiment, the user may input a user interface icon (not shown) via the vehicle HMI presented on the display unit 114 to create the barrier profile associated with the barrier 104. For example, the driver of the vehicle 102 may wish to create the barrier profile that is associated to the barrier 104 (e.g., garage door) located at the driver's home to enable the application 106 to communicate with the barrier controller 108 (e.g., garage door opener) associated with the barrier 104. Once the user selects the respective user interface icon and inputs the name assigned to the barrier 104 per the user's choosing, the barrier control application 106 may store the barrier profile on the storage unit 116 of the vehicle 102. Upon storing the barrier profile on the storage unit 116, a respective indication may be communicated to the location determinant module 146 indicating that the user has setup the barrier profile associated with the barrier 104.

In an exemplary embodiment, upon receiving the indication that the user has setup the barrier profile associated with the barrier 104, the location determinant module 146 may present a barrier location determination user interface (not shown) to the user. The barrier location determination user interface may be utilized by the user to actuate the determination of the geo-location of the barrier 104 when the vehicle 102 is located within the area enclosed by the barrier 104. More specifically, the barrier location determination user interface may include a user interface object(s) that may be inputted by the user to indicate that the vehicle 102 is within the area enclosed by the barrier 104 (e.g., within a garage) to enable the zone determinant module 148 to determine the geo-location of the barrier 104.

In one embodiment, the location determinant module 146 may communicate with the navigation system 132 of the vehicle 102 to determine the geo-location of the barrier 104. The navigation system 132 may access the GPS 132a to determine locational coordinates associated with the location of the vehicle 102. In one embodiment, the navigation system 132 may further access the map database 130a to determine if a highlighted location that may include a dwelling/building that includes the barrier 104 is located within a predetermined proximity of the vehicle 102 (i.e., of the locational coordinates associated with the location of the vehicle 102 as determined by the GPS 132a). The highlighted location may be indicative of a home location saved by the user via the map user interface, a point of interest presented on the map interface, and/or a physical address that is included within the map database 130a.

In one embodiment, when the map database 130a communicates that the highlighted location is located within the predetermined proximity of the vehicle 102, the location determinant module 146 may ask the user (via the barrier location determination user interface) if the user wishes to interpret the highlighted location as the geo-location associated with the barrier 104. If the user does wish to interpret the highlighted location as the geo-location associated with the barrier 104, the location determinant module 146 may access the barrier profile and may populate the locational coordinates associated with the highlighted location as the geo-location associated with the barrier 104.

In an alternate embodiment, upon determining locational coordinates associated with the location of the vehicle 102, the navigation system 132 may communicate with the image sensors 134 and/or the RADAR/LADAR sensors 136 to determine the specific location of the barrier 104 sensed by the sensors 134, 136. Upon determining the specific location of the barrier 104, the zone determinant module 148 may communicate with the navigation system 132 to determine the locational coordinates associated with the barrier 104. The location determinant module 146 may access the barrier profile stored on the storage unit 116 and may populate the locational coordinates of the vehicle 102 as the geo-location associated with the barrier 104.

In an additional embodiment, the user may utilize the map user interface of the navigation system 132 to input a saved location that may be utilized by the application 106 as the location of the barrier 104. For example, the user may input a home location as a saved location on the map user interface. The user may additionally utilize the barrier configuration user interface to input the saved location as the location of the barrier 104. The location determinant module 146 may communicate with the navigation system 132 to determine the geo-location of the barrier 104 based on the saved location. The location determinant module 146 may further access the barrier profile stored on the storage unit 116 and may populate the locational coordinates associated with the saved location as the geo-location associated with the barrier 104.

As discussed below, the stored geo-location may be used by the application 106 to determine if the vehicle 102 is located within the predetermined vicinity of the barrier 104, if the vehicle 102 is located within the area enclosed by the barrier 104, if the vehicle 102 is arriving towards the barrier 104, or if the vehicle 102 is departing away from the barrier 104. Additionally, the stored geo-location may be used by the application 106 to determine the one or more zones associated with the barrier 104 utilized by the application 106 to send one or more signals to the barrier controller 108 based on the location and/or a traveling direction of the vehicle 102 with respect to the barrier 104.

In an exemplary embodiment, the location determinant module 146 may also be utilized to determine the location and/or the traveling direction of the vehicle 102 with respect to the barrier 104. In particular, the location determinant module 146 may determine if the vehicle 102 is located within the area enclosed by the barrier 104 (e.g., a garage), the vehicle 102 is located within the predetermined vicinity of the barrier 104 (e.g., 10 m from the barrier), the vehicle 102 is arriving toward the barrier 104 (e.g., vehicle 102 is being driven to the home where the barrier 104 is located), or the vehicle 102 is departing from the barrier 104 (e.g., vehicle 102 is being driven away from the home where the barrier 104 is located).

In one embodiment, the location determinant module 146 may communicate with the navigation system 132 of the vehicle 102 to determine the locational coordinates associated with the (location of the) vehicle 102. In particular, as the vehicle 102 is being driven or is parked, the location determinant module 146 may communicate with the navigation system 132 to continually determine the locational coordinates associated with the vehicle 102 as provided by the GPS 132a. The location determinant module 146 may also access the barrier profile stored on the storage unit 116 to retrieve the geo-location associated with the barrier 104. Upon retrieving the geo-location associated with the barrier 104, the location determinant module 146 may communicate with the navigation system 132 to determine if the vehicle 102 is within a predetermined distance (e.g., within a 0-200 yards) of the geo-location associated with the barrier 104.

If the navigation system 132 determines that the vehicle 102 is within the predetermined vicinity of the geo-location associated with the barrier 104, the location determinant module 146 may communicate with the navigation system 132 to further determine if the locational coordinates associated with the vehicle 102 match (e.g., within a predetermined GPS geo-fence threshold that may encompass portions of the area enclosed by the barrier 104) the geo-location associated with the barrier 104.

In one embodiment, when the navigation system 132 determines that the locational coordinates associated with the vehicle 102 match the geo-location associated with the barrier 104, the navigation system 132 may communicate respective data to the location determinant module 146. The location determinant module 146 may determine that the vehicle 102 is located within the area enclosed by the barrier 104 and may communicate the location of the vehicle 102 to the other modules 148-154 of the application 106. Similarly, when the navigation system 132 determines that the locational coordinates associated with the vehicle 102 are not including the area enclosed by the barrier 104 but are within the predetermined vicinity of the geo-location associated with the barrier 104, the navigation system 132 may communicate respective data to the location determinant module 146. The location determinant module 146 may determine that the vehicle 102 is located within the predetermined vicinity of the barrier 104 and may communicate the location of the vehicle 102 to the other modules 148-154 of the application 106.

If the location determinant module 146 determines that the vehicle 102 is not located within the predetermined vicinity of the barrier 104 that may include the area enclosed by the barrier 104, but that the vehicle 102 is located within the predetermined distance of the geo-location associated with the barrier 104, the location determinant module 146 may communicate with the vehicle dynamics sensors 138 to determine if the vehicle 102 is enabled (e.g., engine is enabled) and is moving (e.g., vehicle 102 is being driven). If it is determined that the vehicle 102 is enabled and is moving, the location determinant module 146 may communicate with the navigation system 132 to utilize the GPS 132*a* and the map database 132*b* to evaluate if the vehicle 102 is being driven away from geo-location associated with the barrier 104. If the navigation system 132 determines that a distance between the locational coordinates of the vehicle 102, as provided by the GPS 132*a* and the geo-location of the barrier 104 are increasing, the navigation system 132 may communicate respective data to the location determinant module 146. The location determinant module 146 may determine that the vehicle 102 is departing from the barrier 104 and may communicate the location and traveling direction of the vehicle 102 to the other modules 148-154 of the application 106.

If the location determinant module 146 determines that the vehicle 102 is not located within the first predetermined distance of the geo-location associated with the barrier 104, the location determinant module 146 may communicate with the vehicle dynamics sensors 138 to determine if the vehicle 102 is enabled (e.g., engine is enabled) and is moving (e.g., vehicle 102 is being driven). If it is determined that the vehicle 102 is enabled and is moving, the location determinant module 146 may communicate with the navigation system 132 to determine if the vehicle 102 is located within an additional predetermined distance (e.g., 1 mile) of the geo-location associated with the barrier 104 and if the vehicle 102 is arriving towards the barrier 104. In particular, if the navigation system 132 determines that the vehicle 102 is located within the additional predetermined distance of the barrier 104, the navigation system 132 may utilize the GPS 132*a* and the map database 132*b* to evaluate if the vehicle 102 is being driven towards the geo-location associated with the barrier 104. If the navigation system 132 determines that a distance between the locational coordinates of the vehicle 102, as provided by the GPS 132*a* and the geo-location of the barrier 104 is decreasing, the navigation system 132 may communicate respective data to the location determinant module 146. The location determinant module 146 may determine that the vehicle 102 is arriving towards the barrier 104 and may communicate the location and traveling direction of the vehicle 102 to the other modules 148-154 of the application 106.

In an exemplary embodiment, the zone determinant module 148 of the barrier control application 106 may provide a plurality of zones associated with the barrier 104. The plurality of zones may include plurality of areas located at a plurality of distances from the barrier 104. More specifically, the plurality of zones may be used to trigger the sending (e.g., transmission) of RF signals by the vehicle communication system 128 to the transceiver 140 operably connected to the barrier controller 108. As discussed in more detail below, one or more specific zones of the plurality of zones may be associated with the barrier 104 and utilized to send one or more specific signals from the barrier status determinant module 150 or the barrier control module 152 (via the vehicle communication system 128) to the barrier controller 108 (via the transceiver 140) when the vehicle 102 is determined to be arriving towards the barrier 104 and entering the zone(s). Additionally, one or more specific zones of the plurality of zones may be associated with the barrier 104 and utilized to send one or more specific signals from the barrier status determinant module 150 or the barrier control module 152 to the barrier controller 108 when the vehicle 102 is determined to be departing away from the barrier 104 and exiting the zone(s). In particular, the plurality of zones may be specifically associated with the location and/or traveling direction of the vehicle 102 as communicated by the location determinant module 146 when it is determined that the vehicle 102 is arriving towards the barrier 104 or departing away from the barrier 104, as discussed above.

In one or more embodiments, when the vehicle 102 is determined to enter or exit one or more of the respective zones, the barrier status determinant module 150 may utilize the vehicle communication system 128 to send (e.g., transmit) at least one status request signal to the barrier controller 108 to determine the state of the barrier 104. Similarly, when the vehicle 102 is determined to enter or exit one or more of the respective zones, the barrier control module 152 may send at least one barrier control signal to the barrier controller 108 to actuate the movement of the barrier 104 to traverse the barrier 104 to the opened state or the closed state based on the traveling direction of the vehicle 102.

Figure 3:
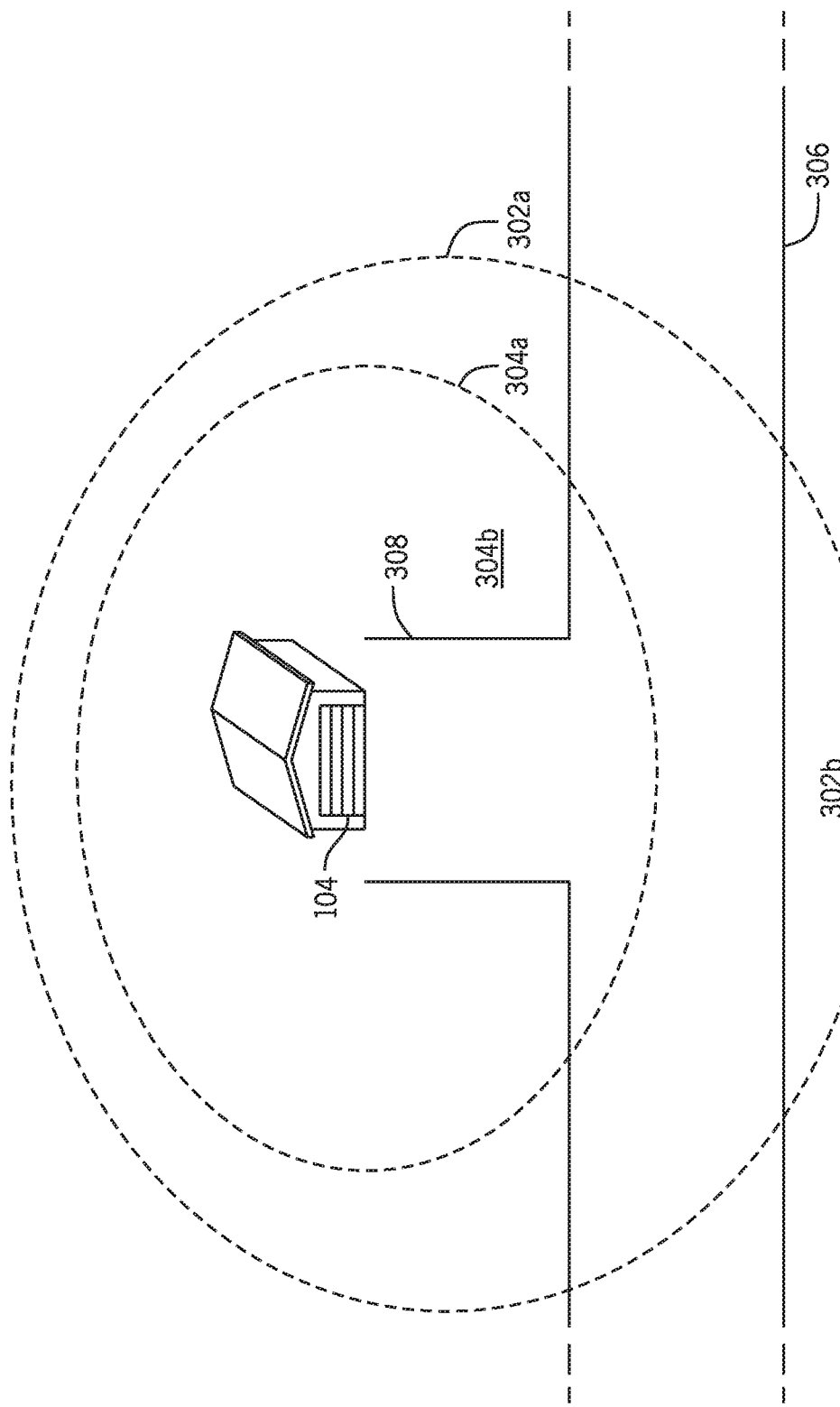
FIG. 3 is an illustrative example of a plurality of zones associated with the barrier that may be applied when the vehicle is determined to be arriving towards the barrier according to an exemplary embodiment.

FIG. 3 is an illustrative example of the plurality of zones associated with the barrier 104 that may be applied when the vehicle 102 is determined to be arriving towards the barrier 104 according to an exemplary embodiment. As shown in the illustrative example of FIG. 3, a boundary 302*a* of an arrival status zone 302*b* may be determined by the zone determinant module 148 and may be provided as an RF communication trigger point for the barrier status determinant module 150 to utilize the vehicle communication system 128 to send (e.g., transmit) one or more status request signals (e.g., RF signals) to the transceiver 140 to be evaluated by the barrier controller 108.

In one embodiment, the zone determinant module 148 may determine the predetermined location at which to provide the arrival status zone 302*b* as a location at which the barrier control system 130 may communicate with the barrier controller 108 an earliest possible point and at a farthest possible distance from the barrier 104. In other words, the zone determinant module 148 may determine a location at which the vehicle 102 may be initially located to transmit and receive RF signals to successfully communicate with the barrier controller 108. This determination may ensure that the state of the barrier 104 is determined and communicated to the barrier control module 152 as earliest as possible to determine the current state of the barrier 104 and to send the barrier control signal(s) to traverse the barrier 104 to the opened state as the vehicle 102 approaches the barrier 104.

In an additional embodiment, the zone determinant module 148 may determine the arrival status zone 302*b* by communicating signal(s) to the navigation system 132 to determine at least one area that is located within an outer surrounding area of the barrier 104 that may be based on a surrounding environment of the barrier 104. The navigation system 132 may communicate map data determined from the map database 130*a* that pertains to the surrounding environment of the barrier 104 to the zone determinant module 148. The zone determinant module 148 may evaluate the map data to determine the street(s) 306 or portions of the street(s) 306 that may be located at one or more predetermined distances outside of the arrival status zone 302*b*. The zone determinant module 148 may determine the street(s) 306 that the vehicle 102 may be driven on to arrive or depart from the barrier 104 and may determine the location and size of the arrival status zone 302*b* that may pertain to one or more environmental variables. The one or more environmental variables that the zone determinant module 148 may take into account when determining the outer arriving geo-fence zone may include, but are not limited to, the length of a street(s) 306 within a vicinity of the barrier 104, the length of the driveway(s) 308 leading up to the barrier 104, the location of the surrounding structures/object(s) within the vicinity of the barrier 104, and the like.

In an exemplary embodiment, upon determining the location of the arrival status zone 302b, the zone determinant module 148 may store a plurality of GPS coordinates associated with the boundary 302a of the arrival status zone 302b. In one or more embodiments, the zone determinant module 148 may communicate with the navigation system 132 to determine the plurality of GPS coordinates (e.g., latitude x, longitude y) of the areas that include the boundary 302a of the arrival status zone 302b. Upon determining the plurality of GPS coordinates associated with the portions of the boundary 302a, the navigation system 132 may communicate the plurality of GPS coordinates to the zone determinant module 148.

Upon determining the location of the arrival status zone 302b, the zone determinant module 148 may access the barrier profile associated with the barrier 104 stored on the storage unit 116 and may populate the plurality of GPS coordinates associated with portions of the boundary 302a of the arrival status zone 302b. As discussed below, the plurality of GPS coordinates populated within the barrier profile may be evaluated in order to send the status request signal(s) to the barrier controller 108 upon the vehicle 102 entering the arrival status zone 302b during the arrival of the vehicle 102 towards the barrier 104.

In an exemplary embodiment, the zone determinant module 148 may additionally determine a barrier opening zone 304b at a determined distance from the barrier 104. As shown in the illustrative example of FIG. 3, the size of the barrier opening zone 304b may be based on one or more variables that ensures that the boundary 304a of the barrier opening zone 304b may be provided at an adequate distance from the barrier 104 to send the barrier control signal(s) to traverse the barrier 104 to the opened state as the vehicle 102 approaches the barrier 104. For example, the boundary 304a of the barrier opening zone 304b may be provided at a determined distance of 30 m from any portion of the boundary 304a to the barrier 104.

In some embodiments, the zone determinant module 148 may analyze data pertaining to the surrounding environment of the vehicle 102 provided by the map database 132b and may determine the barrier opening zone 304b according to one or more environmental variables. The one or more environmental variables may include, but are not limited to, the length of the street(s) 314 within the vicinity of the barrier 104, the length of the driveway(s) 308 leading up to the barrier 104, the location of the surrounding structures/object(s) within the vicinity of the barrier 104, and the like. In particular, the zone determinant module 148 may determine the size of the barrier opening zone 304b to ensure that the barrier control signal(s) may be transmitted to the transceiver 140 at a time that the vehicle 102 is at a requisite distance from the barrier 104. This functionality may ensure that the barrier control signal(s) are sent at an appropriate time to fully open the barrier 104 upon the arrival of the vehicle 102 towards the barrier 104 without compromising the security of contents located behind the barrier 104. For example, in a scenario where the barrier 104 is located at an end of a short driveway 308, the barrier opening zone 304b may include a smaller area surrounding the barrier 104 than a scenario where the barrier 104 is located at an end of a long driveway 308.

In one or more embodiments, the zone determinant module 148 may determine the boundary 304a of the barrier opening zone 304b at a predetermined distance (e.g., 50 m) from the arrival status zone 302b. In particular, upon sending the status request signal(s) to determine the status of the barrier 104, the vehicle 102 will travel the predetermined distance towards the barrier 104 before the barrier control signal(s) is sent to be evaluated by the barrier controller 108.

Upon determining the location of the barrier opening zone 304b, the zone determinant module 148 may communicate with the navigation system 132 to determine the plurality of GPS coordinates (e.g., latitude x, longitude y) of the areas that include the boundary 304a of the barrier opening zone 304b. Upon determining the plurality of GPS coordinates associated with the portions of the boundary 304a, the navigation system 132 may communicate the plurality of GPS coordinates to the zone determinant module 148.

The zone determinant module 148 may access the barrier profile associated with the barrier 104 stored on the storage unit 116 and may populate the plurality of GPS coordinates associated with portions of the boundary 304a of the barrier opening zone 304b. As discussed below, the plurality of GPS coordinates populated within the barrier profile may be evaluated in order to send the barrier control signal(s) to the barrier controller 108 upon the vehicle 102 entering the barrier opening zone 304b during the arrival of the vehicle 102 towards the barrier 104.

It is to be appreciated that the zone determinant module 148 may determine multiple respective arrival status zones and barrier opening zones that may be utilized for multiple barriers. For example, if the home of the user includes a gate as a first barrier and a garage door as a second barrier, the zone determinant module 148 may determine an arrival status zone pertaining to the gate and a separate arriving barrier status zone pertaining to the garage door. Additionally, the zone determinant module 148 may determine a barrier opening zone pertaining to the gate and a separate barrier opening zone pertaining to the garage door.

FIG. 4 is an illustrative example of the plurality of zones associated with the barrier 104 that may be applied when the vehicle 102 is determined to be departing away from the barrier 104 according to an exemplary embodiment. As shown in the illustrative example of FIG. 4, an inner departure status zone 402b may be determined by the zone determinant module 148 and may be provided as an RF communication trigger point for the barrier status determinant module 150 to utilize the vehicle communication system 128 to send at least one status request signal to the transceiver 140 to be evaluated by the barrier controller 108. In particular, as the vehicle 102 is departing from the barrier 104 (e.g., reversing away from the barrier 104), the vehicle 102 may exit the inner departure status zone 402b by crossing a boundary 402a of the inner departure status zone 402b. Upon crossing the boundary 402a, the barrier status determinant module 150 may utilize the vehicle communication system 128 to determine the current status of the barrier 104. As discussed below in more detail, the current status of the barrier 104 may be used to determine if the barrier control module 152 may send the barrier control signal(s) to traverse the barrier 104 to the closed state upon the vehicle 102 exiting a barrier closing zone 404b.

In one or more embodiments, the zone determinant module 148 may analyze the data pertaining to the surrounding environment of the vehicle 102 and may determine the location and size of the inner departure status zone 402b according to the one or more environmental variables. For instance, the zone determinant module 148 may analyze the length of the street(s) 408 within the vicinity of the barrier 104, the length of the driveway(s) 410 leading up to the barrier 104, the location of the surrounding structures/object(s) within the vicinity of the barrier 104, and the like.

In particular, the zone determinant module 148 may determine the size of the inner departure status zone 402*b* to ensure that the current status of the barrier 104 is determined at a requisite time to possibly initiate closure of the barrier 104 upon the departure of the vehicle 102 away from the barrier 104. Upon determining the inner departure status zone 402*b* at the first determined distance from the barrier 104, the zone determinant module 148 may communicate with the navigation system 132 to determine the plurality of GPS coordinates (e.g., latitude x, longitude y) of the areas that include the boundary 402*a* of the inner departure status zone 402*b*.

Upon determining the plurality of GPS coordinates associated with the portions of the boundary 402*a*, the navigation system 132 may communicate the plurality of GPS coordinates to the zone determinant module 148. The zone determinant module 148 may access the barrier profile associated with the barrier 104 stored on the storage unit 116 and may populate the plurality of GPS coordinates associated with portions of the boundary 402*a* of the inner departure status zone 402*b*. As discussed below, the plurality of GPS coordinates populated within the barrier profile may be evaluated in order to send the status request signal(s) to the barrier controller 108 upon the vehicle 102 exiting the inner departure status zone 402*b* during the departure of the vehicle 102 away from the barrier 104. In an exemplary embodiment, the zone determinant module 148 may determine an outer departure status zone 406*b* to ensure that the status of the barrier 104 is determined before the vehicle communication system 128 is out of RF transmission range with respect to the transceiver 140 of the barrier 104.

Upon determining the inner departure status zone 402*b*, the zone determinant module 148 may determine the size of the outer departure status zone 406*b* and may determine a boundary 406*a* of the outer departure status zone 406*b* to be provided as an RF communication trigger point. The zone determinant module 148 may utilize the boundary 406*a* of the outer departure status zone 406*b* as the trigger point for the barrier status determinant module 150 to utilize the vehicle communication system 128 to send at least one status request signal to the transceiver 140 to be evaluated by the barrier controller 108.

In an exemplary embodiment, the boundary 406*a* of the outer departure status zone 406*b* may be provided at an area that is determined to be within a predetermined short distance to a furthest area (in each direction) from the barrier 104 from which the vehicle 102 and the barrier controller 108 are capable of communicating via RF signal transmission. In other words, the boundary 406*a* may be provided at an area before the vehicle 102 is no longer capable of completing RF communication with the barrier controller 108. Stated differently, the boundary 406*a* may include furthest locations that the vehicle 102 is capable of transmitting RF signals to the barrier controller 108 and is capable of receiving RF signals from the barrier controller 108. Consequently, based on the location of the boundary 406*a* and the size of the outer departure status zone 406*b*, the zone determinant module 148 may ensure that the state of the barrier 104 is determined and communicated to barrier status presentation module 154 to present the current state of the barrier 104 to the user at a point in time when the vehicle 102 is located at the predetermined (short) distance from the exiting the outer departure status zone 406*b*.

In some embodiments, the zone determinant module 148 may analyze the data pertaining to the surrounding environment of the vehicle 102 and may determine the location and size of the outer departure status zone 406*b* according to the one or more environmental variables. For instance, the zone determinant module 148 may analyze the length of the street(s) 408 within the vicinity of the barrier 104, the length of the driveway(s) 410 leading up to the barrier 104, the location of the surrounding structures/object(s) within the vicinity of the barrier 104, and the like. In particular, the zone determinant module 148 may determine the size of the outer departure status zone 406*b* to ensure that the current status of the barrier 104 is determined at a requisite time for the barrier control signal(s) to be transmitted to the transceiver 140 before the vehicle communication system 128 is out of an RF range with the transceiver 140. This functionality may ensure that the barrier control signal(s) are sent at an appropriate time to check the status of the closure of the barrier 104 upon the departure of the vehicle 102 away from the barrier 104.

Upon determining the location and size of the outer departure status zone 406*b* at the dynamic distance from the barrier 104, the zone determinant module 148 may communicate with the navigation system 132 to determine the plurality of GPS coordinates (e.g., latitude x, longitude y) of the areas that include the boundary 406*a* of the outer departure status zone 406*b*. Upon determining the plurality of GPS coordinates associated with the portions of the boundary 406*a*, the navigation system 132 may communicate the plurality of GPS coordinates to the zone determinant module 148. The zone determinant module 148 may access the barrier profile associated with the barrier 104 stored on the storage unit 116 and may populate the plurality of GPS coordinates associated with portions of the boundary 406*a* of the outer departure status zone 406*b*. As discussed below, the plurality of GPS coordinates populated within the barrier profile may be evaluated in order to send the status request signal(s) to the barrier controller 108 upon the vehicle 102 being located at the predetermined distance from exiting the outer departure status zone 406*b* during the departure away from the barrier 104.

In an exemplary embodiment, the zone determinant module 148 may additionally determine a barrier closing zone 404*b* at a determined distance from the barrier 104 that is located between the outer departure status zone 406*b* and the inner departure status zone 402*b*. The size of the barrier closing zone 404*b* may be determined by the zone determinant module 148 based on one or more variables that ensures that the boundary 404*a* of the barrier closing zone 404*b* may be provided at an adequate distance (e.g., 30 m) from the barrier 104 to send the barrier control signal(s) to traverse the barrier 104 to the closed state before the vehicle 102 enters into an area 412 that is outside of the outer departure status zone 418*a* and consequently outside of an RF transmission range between the vehicle communication system 128 and the transceiver 140. For example, the boundary 404*a* may be provided at a determined distance of 15 m from any portion of the boundary 404*a* to the barrier 104.

In one embodiment, the zone determinant module 148 may determine the barrier closing zone 404*b* at a predetermined distance (e.g., 60 m) from the outer departure status zone 406*b*. In particular, upon sending the status request signal(s) to determine the status of the barrier 104, the vehicle 102 will travel the predetermined distance away from the barrier 104 before the barrier control signal(s) is sent to be evaluated by the barrier controller 108.

In some embodiments, the zone determinant module 148 may additionally or alternately determine the barrier closing zone 404*b* at a predetermined distance (e.g., 15 m) from the inner departure status zone 402*b*. In other words, the determination of the location of the first determined distance from the barrier 104 at which the inner departure status zone 402*b* may be provided may be utilized to determine the location at which the barrier closing zone 404*b* is provided. In particular, upon sending the status request signal(s) to determine the status of the barrier 104, the vehicle 102 will exit the inner departure status zone 402*b* and travel the predetermined distance away from the inner departure status zone 402*b* before the barrier control signal(s) is sent to be evaluated by the barrier controller 108.

In an additional embodiment, the zone determinant module 148 may analyze the data pertaining to the surrounding environment of the vehicle 102 and may determine the location and size of the barrier closing zone 404*b* according to the one or more environmental variables. For instance, the zone determinant module 148 may analyze the length of the street(s) 408 within the vicinity of the barrier 104, the length of the driveway(s) 410 leading up to the barrier 104, the location of the surrounding structures/object(s) within the vicinity of the barrier 104, and the like. In particular, the zone determinant module 148 may determine the size of the barrier closing zone 404*b* to ensure that the barrier control signal(s) may be transmitted to the transceiver 140 before the vehicle communication system 128 is out of an RF range with the transceiver 140.

In an exemplary embodiment, upon determining the barrier closing zone 404*b*, the zone determinant module 148 may communicate with the navigation system 132 to determine the plurality of GPS coordinates (e.g., latitude x, longitude y) of the areas that include the boundary 404*a* of the barrier closing zone 404*b*. Upon determining the plurality of GPS coordinates associated with the portions of the boundary 404*a*, the navigation system 132 may communicate the plurality of GPS coordinates to the zone determinant module 148. The zone determinant module 148 may access the barrier profile associated with the barrier 104 stored on the storage unit 116 and may populate the plurality of GPS coordinates associated with portions of the boundary 404*a* of the barrier closing zone 404*b*. As discussed below, the plurality of GPS coordinates populated within the barrier profile may be evaluated in order to send the barrier control signal(s) to the barrier controller 108 upon the vehicle 102 exiting the barrier closing zone 404*b* during the departure away from the barrier 104.

It is to be appreciated that the zone determinant module 148 may determine multiple respective inner departure status zones, outer departure status zones, and barrier closing zones that may be utilized for multiple barriers. For example, if the home of the user includes a gate as a first barrier and a garage door as a second barrier, the zone determinant module 148 may determine an inner departure status zone and an outer departure status zone pertaining to the gate and a separate inner departure status zone and outer departure status zone pertaining to the garage door. Additionally, the zone determinant module 148 may determine a barrier closing zone pertaining to the gate and a separate barrier closing zone pertaining to the garage door.

Figure 5A:
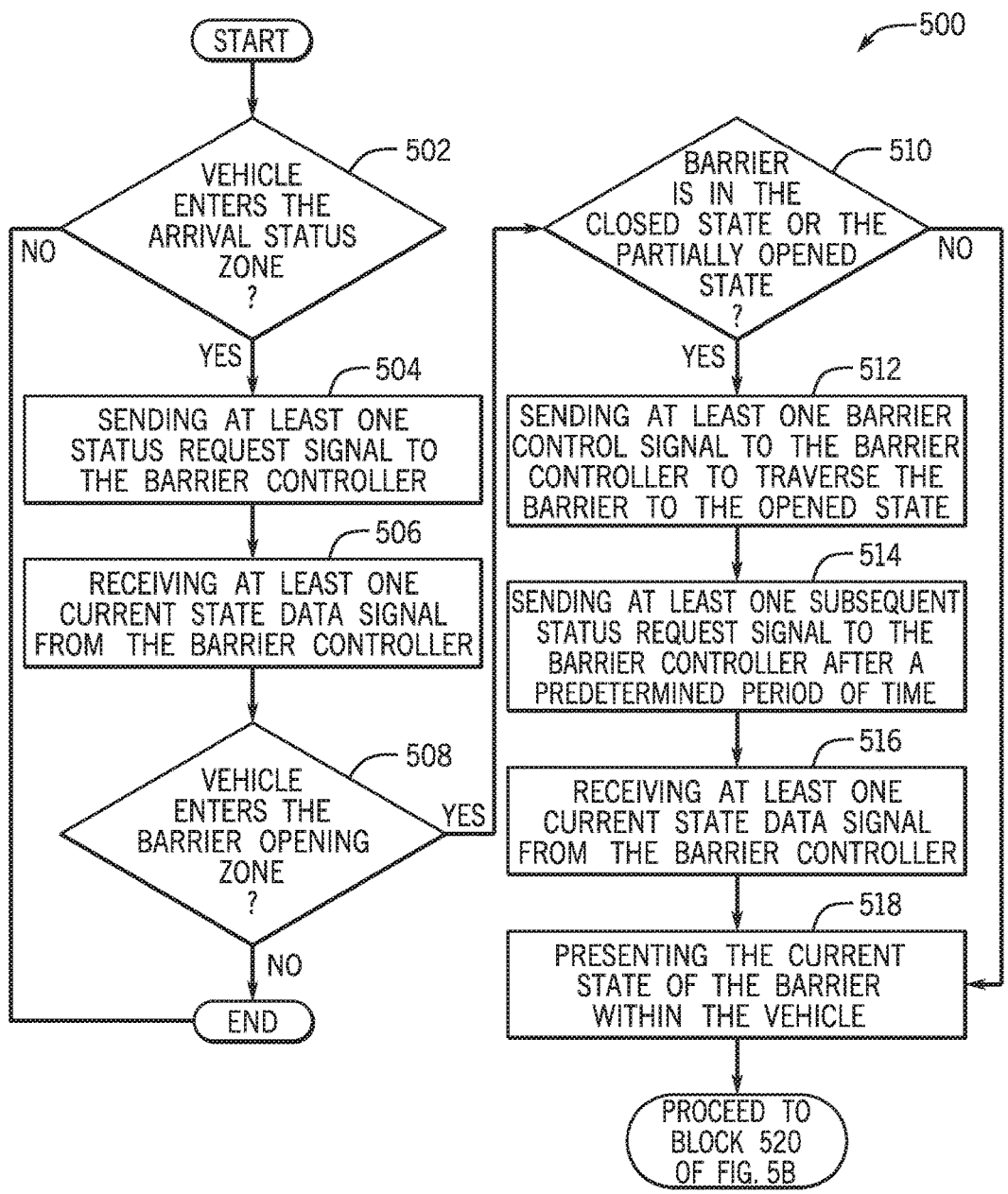
FIG. 5A is a process flow diagram of a first part of a method for automatically controlling movement of the barrier when the vehicle is determined to be arriving towards the barrier according to an exemplary embodiment.

FIG. 5A is a process flow diagram of a first part of a method 500 for automatically controlling movement of the barrier 104 when the vehicle 102 is determined to be arriving towards the barrier 104 according to an exemplary embodiment. FIG. 5A will be described with reference to the components of FIG. 1 though it is to be appreciated that the method 500 of FIG. 5 may be used with other systems and/or components. As described below, the method 500 will be discussed in two parts with respect to FIG. 5A and FIG. 5B. The method 500 may begin at block 502, wherein the method 500 may include determining if the vehicle 102 enters the arrival status zone 302*b*. As discussed above, upon determining the arrival status zone 302*b* (shown in FIG. 3), the zone determinant module 148 may populate the barrier profile associated with the barrier 104 with the plurality of GPS coordinates associated with portions the boundary 302*a* of the arrival status zone 302*b*. In one embodiment, as the vehicle 102 is being driven, the location determinant module 146 may communicate with the navigation system 132 to continually determine the locational coordinates associated with the vehicle 102 as provided by the GPS 132*a*.

The location determinant module 146 may also access the barrier profile stored on the storage unit 116 and may communicate with the navigation system 132 to determine if the vehicle 102 is entering any of the portions of the boundary 302*a* of the arrival status zone 302*b*. More specifically, the location determinant module 146 may continually compare the locational coordinates of the vehicle 102 against the plurality of GPS coordinates associated with portions of the boundary 302*a* to determine if they overlap with one another. If it is determined that the overlapping of the locational coordinates of the vehicle 102 occurs with the plurality of GPS coordinates associated with portions of the boundary 302*a*, the location determinant module 146 may determine that the vehicle 102 enters the arrival status zone 302*b*. For example, with reference to FIG. 3, if the vehicle 102 is being driven towards the barrier 104, the vehicle 102 may enter the arrival status zone 302*b*. In such a scenario, the location determinant module 146 may determine when the vehicle 102 enters the arrival status zone 302*b* once the vehicle 102 crosses one of the portions of the boundary 302*a*.

If it is determined that the vehicle 102 enters the arrival status zone 302*b* (at block 502), the method 500 may proceed to block 504, wherein the method 500 may include sending at least one status request signal to the barrier controller 108. In an exemplary embodiment, upon the location determinant module 146 determining that the vehicle 102 is crossing one of the portions of the boundary 302*a* to enter the arrival status zone 302*b*, the location determinant module 146 may communicate respective data to the barrier status determinant module 150. The barrier status determinant module 150 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 150 may send the status request data signal(s) to determine if the barrier 104 is currently in the opened state, the closed state, or the partially opened state.

The method 500 may proceed to block 506, wherein the method 500 may include receiving at least one current state data signal from the barrier controller 108. In one or more embodiments, the barrier controller 108 may evaluate the one or more status request signals received by the transceiver 140 and may determine the current state of the barrier 104. The barrier controller 108 may determine the current state as the opened state when the barrier 104 is in a fully opened position. Additionally, the barrier controller 108 may determine the current state as the closed state when the barrier 104 is in a fully closed position. In some embodiments, the barrier controller 108 may determine the current state of the barrier 104 as the partially opened state when the barrier 104 is partially opened. The barrier controller 108 may further determine the barrier traversing level of the barrier 104 (e.g., 65% open) when the current state of the barrier 104 is the partially opened state.

In an exemplary embodiment, upon determining the current state of the barrier 104, the barrier controller 108 may utilize the transceiver 140 to communicate the one or more current state data signals that include the current state of the barrier 104 as the opened state, the closed state, or the partially opened state to the vehicle communication system 128. In some embodiments, when the barrier 104 is determined to be in the partially opened state, the current data state data signal(s) may additionally include the barrier traversing level of the barrier 104. Upon evaluating the current state of the barrier 104, the barrier status determinant module 150 may communicate respective data to the barrier control module 152 to evaluate the current state of the barrier 104.

The method 500 may proceed to block 508, wherein the method 500 may include determining if the vehicle 102 enters the barrier opening zone 304b. With reference to FIG. 3, upon the vehicle 102 entering the arrival status zone 302b, the vehicle 102 may continue to travel through the arrival status zone 302b towards the barrier 104. As the vehicle 102 is traveling through the arrival status zone 302b, the location determinant module 146 may access the barrier profile stored on the storage unit 116 and may communicate with the navigation system 132 to determine if the vehicle 102 is entering any of the portions of the boundary 304a of the barrier opening zone 304b. More specifically, the location determinant module 146 may continue to compare the locational coordinates of the vehicle 102 against the plurality of GPS coordinates associated with portions of the boundary 304a to determine if they overlap with one another. If it is determined that the overlapping of the locational coordinates of the vehicle 102 occurs with the plurality of GPS coordinates associated with portions of the boundary 304a, the barrier control module 152 determines that the vehicle 102 enters the barrier opening zone 304b.

If it is determined that the vehicle 102 enters the barrier opening zone 304b (at block 508), the method 500 may proceed to block 510, wherein the method 500 may include determining if the barrier 104 is in the closed state or the partially opened state. As discussed above, upon evaluating the current state of the barrier 104, the barrier status determinant module 150 may communicate respective data to the barrier control module 152 to evaluate the current state of the barrier 104. The barrier control module 152 may evaluate the current state and determine if the barrier 104 is in the closed state or the partially opened state as communicated by the barrier controller 108 (at block 506).

If it is determined that the barrier 104 is in the closed state or the partially opened state (at block 510), the method 500 may proceed to block 512, wherein the method 500 may include sending at least one barrier control signal to the barrier controller 108 to traverse the barrier 104 to the opened state. In an exemplary embodiment, the barrier control module 152 may utilize the current state of the barrier 104 as the closed state or the partially opened state to accordingly send the one or more barrier control signals to remotely control the movement of the barrier 104 to traverse the barrier 104 to the opened state. More specifically, if the barrier control module 152 determines that the current state of the barrier 104 is the closed state (at block 510), the barrier control module 152 may utilize the vehicle communication system 128 to send the one or more barrier control signals to the transceiver 140 to traverse the barrier 104 from the closed state to the opened state. Likewise, if the barrier control module 152 determines that the current state of the barrier 104 is the partially opened state (at block 510), the barrier control module 152 may utilize the vehicle communication system 128 to send the one or more barrier control signals to the transceiver 140 to traverse the barrier 104 from the partially opened state to the (fully) opened state. The barrier controller 108 may evaluate the received barrier control signals and may responsively traverse the barrier 104 from the closed state or partially opened state to the opened state.

The method 500 may proceed to block 514, wherein the method 500 may include sending at least one subsequent status request signal to the barrier controller 108 after a predetermined period of time. In one or more embodiments, upon sending the at least one barrier control signal to the barrier controller 108 to traverse the barrier 104 to the opened state (at block 512), the barrier control module 152 may communicate respective data to the barrier status determinant module 150. The barrier status determinant module 150 may send at least one subsequent status request signal to the barrier controller 108 to determine the current status of the barrier 104. This determination may be made within the predetermined period of time to allow the barrier 104 time to traverse to the opened state. Additionally, this determination may be made to indicate if the barrier 104 has in fact traversed to the opened state or if the barrier 104 did not do so. For instance, the barrier 104 may not traverse to the fully opened state even after the barrier controller 108 receives the barrier control signal(s) based on a mechanical issue with respect to the one or more components connected to the barrier controller 108 (shown in FIG. 2).

In one embodiment, the barrier status determinant module 150 may responsively utilize the vehicle communication system 128 to send the one or more subsequent status request signals to the transceiver 140 to be evaluated by the barrier controller 108 to determine the current state of the barrier 104. In other words, the barrier status determinant module 150 may send the status request data signal(s) to determine if the barrier 104 did in fact traverse to the opened state based on the sending of the barrier control signal(s) (at block 512).

The method 500 may proceed to block 516, wherein the method 500 may include receiving at least one current state data signal from the barrier controller 108. In one or more embodiments, the barrier controller 108 may evaluate the one or more subsequent status request signals received by the transceiver 140 and may determine the current state of the barrier 104. In an exemplary embodiment, upon determining the current state of the barrier 104, the barrier controller 108 may utilize the transceiver 140 to communicate the one or more current state data signals that include the current state of the barrier 104 as the opened state, the closed state, or the partially opened state to vehicle communication system 128.

Upon receiving the at least one current state data signal from the barrier controller 108 (at block 516), or determining that the barrier 104 is (already) in the opened state (e.g., based on a previous manual actuation of the movement of the barrier 104 as provided by the user) (at block 510), the method 500 may proceed to block 518, wherein the method 500 may include presenting the current state of the barrier 104 within the vehicle 102. In one embodiment, upon evaluating the current state of the barrier 104, the barrier status determinant module 150 may communicate respective data to the barrier status presentation module 154.

As discussed above, the barrier status presentation module 154 may be utilized to communicate with the infotainment system 118 to present the barrier status user interface. The barrier status user interface may present the current status of the barrier 104 to the user. In particular, the barrier status user interface may be presented to the user on the display unit 114 to inform the user of the current state of the barrier 104 prior to the vehicle 102 arriving at the barrier 104. Accordingly, as the vehicle 102 is arriving towards the barrier 104, the barrier status user interface may inform the user that the barrier 104 is in the opened state or that the barrier 104 is still in the closed state or the partially opened state (e.g., based on some mechanical issue that may have occurred).

Figure 5B:
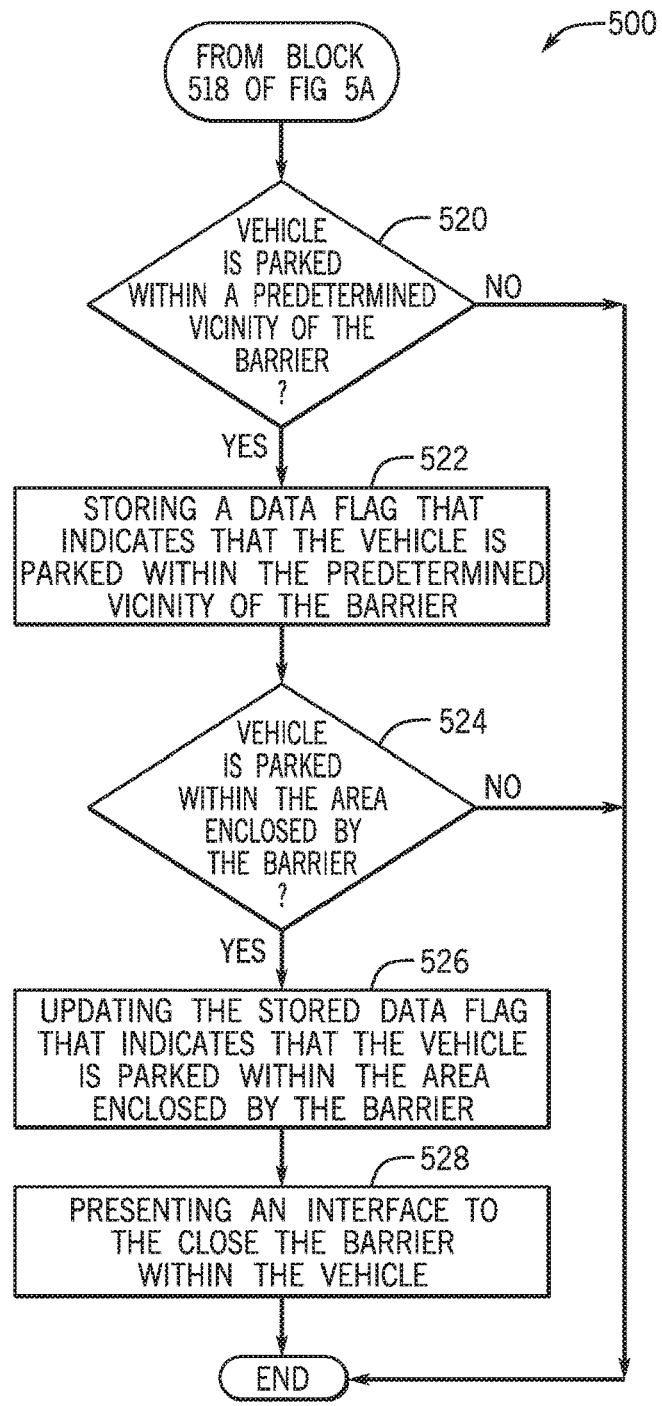
FIG. 5B is a process flow diagram of a second part of the method for automatically controlling movement of the barrier when the vehicle is determined to be arriving towards the barrier according to an exemplary embodiment.

FIG. 5B is a process flow diagram of a second part of the method 500 for automatically controlling movement of the barrier 104 when the vehicle 102 is determined to be arriving towards the barrier 104 according to an exemplary embodiment. FIG. 5B will be described with reference to the components of FIG. 1 though it is to be appreciated that the method 500 of FIG. 5B may be used with other systems and/or components. Upon presenting the current state of the barrier 104 within the vehicle 102 (as discussed with respect to block 518 of FIG. 5A), the method 500 may proceed to block 520 wherein the method 500 may include determining if the vehicle 102 is parked within a predetermined vicinity of the barrier 104. If it is determined that the vehicle 102 enters the barrier opening zone 304b (at block 508), and the at least one barrier control signal is sent to the barrier controller 108, the location determinant module 146 may continually determine the locational coordinates associated with the vehicle 102 as provided by the GPS 132a.

In particular, the location determinant module 146 may determine the locational coordinates of the vehicle 102 as the vehicle 102 approaches the location of the barrier 104. As discussed above, the navigation system 132 may determine that the locational coordinates associated with the vehicle 102 are within the predetermined vicinity of the geo-location associated with the barrier 104 and may communicate respective data to the location determinant module 146. The location determinant module 146 may determine that the vehicle 102 is located within the predetermined vicinity of the barrier 104. If it is determined that the vehicle 102 is located within the predetermined vicinity of the barrier 104, the location determinant module 146 may communicate with the vehicle dynamics sensors 138 to evaluate vehicle dynamics information and determine if the vehicle 102 is disabled (e.g., engine of the vehicle 102 is disabled). If the location determinant module 146 determines that the vehicle 102 is disabled, the module 146 further determines that the vehicle 102 is parked within the predetermined vicinity of the barrier 104.

If it is determined that the vehicle 102 is parked within the predetermined vicinity of the barrier 104 (at block 520), the method 500 may proceed to block 522, wherein the method 500 may include storing a data flag that indicates that the vehicle 102 is parked within the predetermined vicinity of the barrier 104. In one embodiment, the location determinant module 146 may create a data flag (e.g., data file) and may access the barrier profile associated with the barrier 104 stored on the storage unit 116. The location determinant module 146 may populate the barrier profile with the data flag that indicates that the vehicle 102 is parked within the predetermined vicinity of the barrier 104 that may include the area enclosed by the barrier 104. As an illustrative example, when the vehicle 102 is parked on a driveway outside of a garage enclosed by the barrier 104 after arriving towards the barrier 104, the location determinant module 146 may determine that the vehicle 102 is parked within the predetermined vicinity of the barrier 104 and may populate the barrier profile associated with the barrier 104 stored on the storage unit 116 with the data flag.

The method 500 may proceed to block 524, wherein the method 500 may include determining if the vehicle 102 is parked within the area enclosed by the barrier 104. When the navigation system 132 determines that the vehicle 102 is within the predetermined vicinity of the barrier 104, the location determinant module 146 may communicate with the navigation system 132 to further determine if the locational coordinates associated with the vehicle 102 match (e.g., within a predetermined GPS geo-fence threshold that may encompass portions of the area enclosed by the barrier 104) the geo-location associated with the barrier 104. In one embodiment, when the navigation system 132 determines that the locational coordinates associated with the vehicle 102 match the geo-location associated with the barrier 104, the navigation system 132 may communicate respective data to the location determinant module 146. The location determinant module 146 may determine that the vehicle 102 is located within the area enclosed by the barrier 104.

If it is determined that the vehicle 102 is parked within the area enclosed by the barrier 104 (at block 524), the method 500 may proceed to block 526, wherein the method 500 may include updating the stored data flag that indicates that the vehicle 102 is parked within the area enclosed by the barrier 104. In one embodiment, the location determinant module 146 may access the barrier profile associated with the barrier 104 stored on the storage unit 116 and may update the data flag that indicates that the vehicle 102 is parked within the predetermined vicinity of the barrier 104 with additional data further indicating that the vehicle 102 is parked within the area enclosed by the barrier 104. As an illustrative example, when the vehicle 102 is parked within a garage enclosed by the barrier 104 after arriving towards the barrier 104, the location determinant module 146 may determine that the vehicle 102 is parked within the garage and may update the data flag included within the barrier profile stored on the storage unit 116. As discussed below, the data flag may be further evaluated by the application 106 prior to a potential departure of the vehicle 102 away from the barrier 104.

The method 500 may proceed to block 528, wherein the method 500 may include presenting an interface to close the barrier 104 within the vehicle 102. In an exemplary embodiment, upon determining that the vehicle 102 is parked within the predetermined vicinity of the barrier 104 (at block 520) that may include the area enclosed by the barrier 104 (at block 524) and storing and possibly updating the data flag that indicates that the vehicle 102 is parked within the predetermined vicinity of the barrier 104 that may include the area enclosed by the barrier 104, the location determinant module 146 may communicate respective data to the barrier status presentation module 154.

The barrier status presentation module 154 may present the barrier status user interface on the display unit 114 within the vehicle 102. The barrier status user interface may include a user interface object that the user may input to close the barrier to the user that the application 106. In some embodiments, the barrier status user interface may be presented only after indication is received by the vehicle dynamics sensors 138 that the engine of the vehicle 102 is disabled. With reference to the aforementioned illustrative example, as the vehicle 102 is parked within predetermined vicinity of the barrier 104, the user may be presented with the barrier status user interface to enable the user to efficiently traverse the barrier 104 to the closed state from the opened state. In one embodiment, if the user inputs the user interface object, the barrier status presentation module 154 may communicate respective data to the barrier control module 152. The barrier control module 152 may responsively send the barrier control signal(s) to be evaluated by the barrier controller 108 to traverse the barrier 104 to the closed state.

Figure 6A:
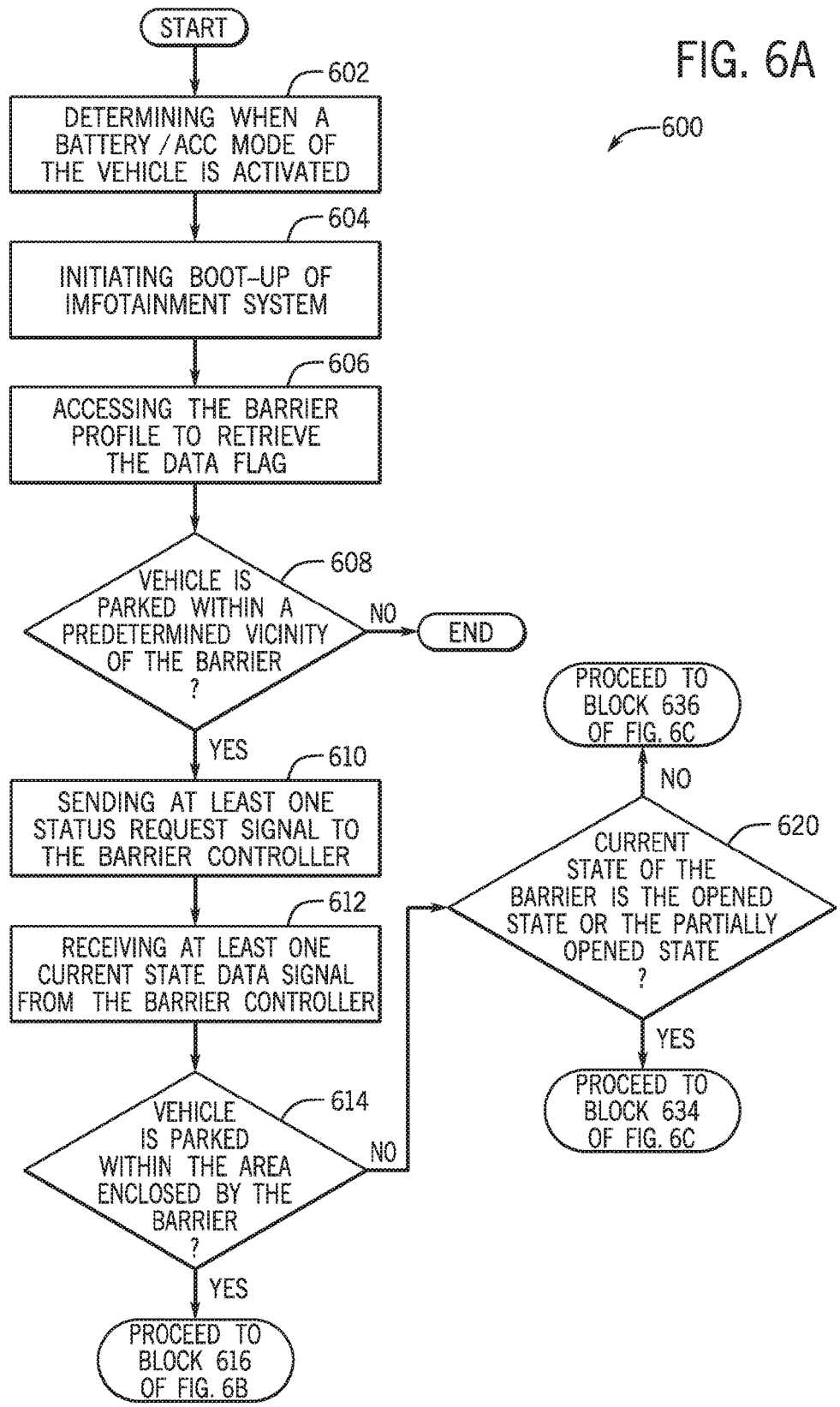
FIG. 6A is a process flow diagram of a first part of a method for automatically controlling movement of the barrier during a departure of the vehicle away from the barrier according to an exemplary embodiment.

FIG. 6A is a process flow diagram of a first part of a method 600 for automatically controlling movement of the barrier 104 during a departure of the vehicle 102 away from the barrier 104 according to an exemplary embodiment. FIG. 6A will be described with reference to the components of FIG. 1 though it is to be appreciated that the method 600 of FIG. 6A may be used with other systems and/or components. As described below, the method 600 will be discussed in three parts with respect to FIG. 6A-FIG. 6C.

The method 600 may begin at block 602, wherein the method 600 includes determining when a battery/ACC mode of the vehicle 102 is activated. In an exemplary embodiment, upon the user putting the vehicle 102 into the battery/ACC mode by pushing an ignition start push button (not shown), the vehicle dynamics sensors 138 may provide respective dynamics information to the location determinant module 146 of the barrier control application 106. Upon evaluation of the dynamics information, the location determinant module 146 may determine that the battery/ACC mode of the vehicle 102 is activated. In some circumstances, the activation of the battery/ACC mode may only ensure that the battery/ACC mode is enabled for a short period of time before the vehicle 102 (engine) is enabled based on the user pushing a brake pedal (not shown) while pushing the ignition start push button. However, in one or more embodiments, the location determinant module 146 utilizes the activation of the battery/ACC mode to enable the barrier control application 106 to initiate the method 600 irrespective of the full enablement of the vehicle 102.

The method 600 may proceed to block 604, wherein the method 600 may include initiating boot-up of the infotainment system 118. Upon the battery/ACC mode of the vehicle 102 being activated, the ECU 110 of the vehicle 102 may send a corresponding signal(s) to the infotainment system 118 to enable and boot-up the system 118 to provide infotainment services. As discussed above, the infotainment system 118 may be operably connected to the barrier control system 130 to send and receive data signals that may be utilized to remotely control the barrier 104. The infotainment system 118 may also be utilized to provide the barrier status user interface to the user through a display unit 114 operably connected to the infotainment system 118. The barrier control application 106 may continue to execute the method 600 as the infotainment system 118 is completing the process of fully booting up to ensure that determining the status of the barrier 104 and remotely controlling the movement of the barrier 104 are not dependent on the full boot-up and operation of the infotainment system 118 since the infotainment system 118 may require a sufficient amount of time to fully boot up.

The method 600 may proceed to block 606, wherein the method 600 may include accessing the barrier profile to retrieve the data flag. As discussed above, the location determinant module 146 may determine that the vehicle 102 is parked within the predetermined vicinity of the barrier 104 that may include the area enclosed by the barrier 104 and may store and update the data flag included within the barrier profile stored on the storage unit 116 accordingly. In one embodiment, the location determinant module 146 may access the barrier profile from the storage unit 116 and may retrieve the data flag to be evaluated to determine the location of the vehicle 102.

The method may proceed to block 608, wherein the method 600 may include determining if the vehicle 102 is parked within a predetermined vicinity of the barrier 104. As discussed above, when the vehicle 102 is determined to be parked within the predetermined vicinity of the barrier 104, the location determinant module 146 may access the barrier profile associated with the barrier 104 and may populate the barrier profile with the data flag that indicates that the vehicle 102 is parked within the predetermined vicinity of the barrier 104. Upon accessing the barrier profile to retrieve the data flag (at block 606), the location determinant module 146 may evaluate the data flag to determine that the vehicle 102 is parked at the predetermined vicinity of the barrier 104. In one embodiment, if the location determinant module 146 accesses the barrier profile and does not retrieve (e.g., based on not finding) the data flag, the location determinant module 146 may determine that the vehicle 102 is not parked within the predetermined vicinity of the barrier 104.

If it is determined that the vehicle 102 is parked within the predetermined vicinity of the barrier 104 (at block 608), the method 600 may proceed to block 610, wherein the method 600 may include sending at least one status request signal to the barrier controller 108. In an exemplary embodiment, upon determining that the vehicle 102 is parked within a predetermined vicinity of the barrier 104 (at block 608), the location determinant module 146 may communicate with the barrier status determinant module 150 to initiate a determination of the current state of the barrier 104. The barrier status determinant module 150 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 150 may send the status request data signal(s) to determine if the barrier 104 is currently in the opened state, the closed state, or the partially opened state.

The method 600 may proceed to block 612 wherein the method 600 may include receiving at least one current state data signal from the barrier controller 108. In an exemplary embodiment, upon determining the current state of the barrier 104, the barrier controller 108 may utilize the transceiver 140 to communicate the one or more current state data signals that include the current state of the barrier 104 as the opened state, the closed state, or the partially opened state to vehicle communication system 128. In one embodiment, the barrier status determinant module 150 may interpret the current state of the barrier 104 upon determining that the vehicle 102 is parked within the predetermined vicinity of the barrier 104 as an initial state of the barrier 104 prior to the vehicle 102 departing from the barrier 104.

The method 600 may proceed to block 614, wherein the method 600 may include wherein the method 600 may include determining if the vehicle 102 is parked within the area enclosed by the barrier 104. As discussed above, when the vehicle 102 is determined to be parked within the area enclosed by the barrier 104, the location determinant module 146 may access the barrier profile associated with the barrier 104 and may update the data flag that indicates that the vehicle 102 is parked within the predetermined vicinity of the barrier 104 with additional data further indicating that the vehicle 102 is parked within the area enclosed by the barrier 104. Upon accessing the barrier profile to retrieve the data flag (at block 606) and determining that the vehicle 102 is parked within the predetermined vicinity of the barrier 104 (at block 608), the location determinant module 146 may evaluate the data flag and may determine that the vehicle 102 is parked within the area enclosed by the barrier 104 based on the updating of the data flag previously completed by the location determinant module, as discussed above. As an illustrative example, when the vehicle 102 is parked within a garage enclosed by the barrier 104 (garage door), the location determinant module 146 may accordingly determine that the vehicle 102 is parked within the area enclosed by the barrier 104.

In one embodiment, if the location determinant module 146 accesses the barrier profile and does not retrieve (e.g., based on not finding) the data flag, the location determinant module 146 may determine that the vehicle 102 is not parked within the predetermined vicinity of the barrier 104 including the area enclosed by the barrier 104. Additionally, if the location determinant module 146 accesses the barrier profile and does retrieve the data flag but determines that the data flag does not indicate that the vehicle 102 is parked within the area enclosed by the barrier 104, the location determinant module 146 may determine that the vehicle 102 is not parked within the area enclosed by the barrier 104. As an illustrative example, with reference to FIG. 4, when the vehicle 102 is parked on the driveway 410 outside of the garage that includes the barrier 104 (garage door), the data flag may indicate that the vehicle 102 is parked within the predetermined vicinity of the barrier 104 but may not indicate that the vehicle 102 is parked within the garage (area enclosed by the barrier 104).

With continued reference to FIG. 6A, if it is determined that the vehicle 102 is not parked within the area enclosed by the barrier 104 (at block 614), the method 600 may proceed to block 620, wherein the method 600 may include determining if the current state of the barrier 104 is the opened state or the partially opened state. Upon receiving the one or more current state data signals that include the current state of the barrier 104 (at block 612), the vehicle communication system 128 may communicate the current state of the barrier 104 to the barrier status determinant module 150. The barrier status determinant module 150 may responsively determine if the current state of the barrier 104 is in the closed state, the partially opened state, or the opened state. This determination may be made by the barrier status determinant module 150 to determine if the user manually actuated movement of the barrier 104 to close the barrier 104 prior to driving the vehicle 102 such that remote control of the movement of the barrier 104 may not be necessary.

If it is determined that the current state of the barrier 104 is the opened state or partially opened state (at block 620), the method 600 may proceed to block 634, wherein the method 600 may include sending at least one barrier control signal to the barrier controller 108 to traverse the barrier 104 to the closed state. This functionality (discussed in more detail below) may ensure that the barrier 104 is automatically and remotely controlled to be put into the closed state as the vehicle 102 is driven away from the barrier 104.

As discussed above, when the vehicle 102 is determined to be departing from the barrier 104, the application 106 ensures that determining the status of the barrier 104 and remotely controlling the movement of the barrier 104 are not dependent on the operation of the infotainment system 118. As discussed, the infotainment system 118 may not fully boot up as the vehicle 102 is departing away from the barrier 104 and travels outside of the RF transmission range between the vehicle communication system 128 and the transceiver 140. This functionality may ensure that the barrier 104 may be automatically controlled to be closed and the status of the barrier 104 may be ascertained by the user in a situation when the vehicle 102 is traveling at a high rate of speed as the vehicle 102 departs from the barrier 104 and is located outside of the RF transmission range before the infotainment system 118 boots up. If it is determined that the current state of the barrier 104 is the closed state (at block 620), the method 600 may proceed to block 636, wherein the method 600 may determine if the vehicle 102 is located a predetermined distance from exiting the outer departure status zone, as will be discussed in more detail below.

Figure 6B:
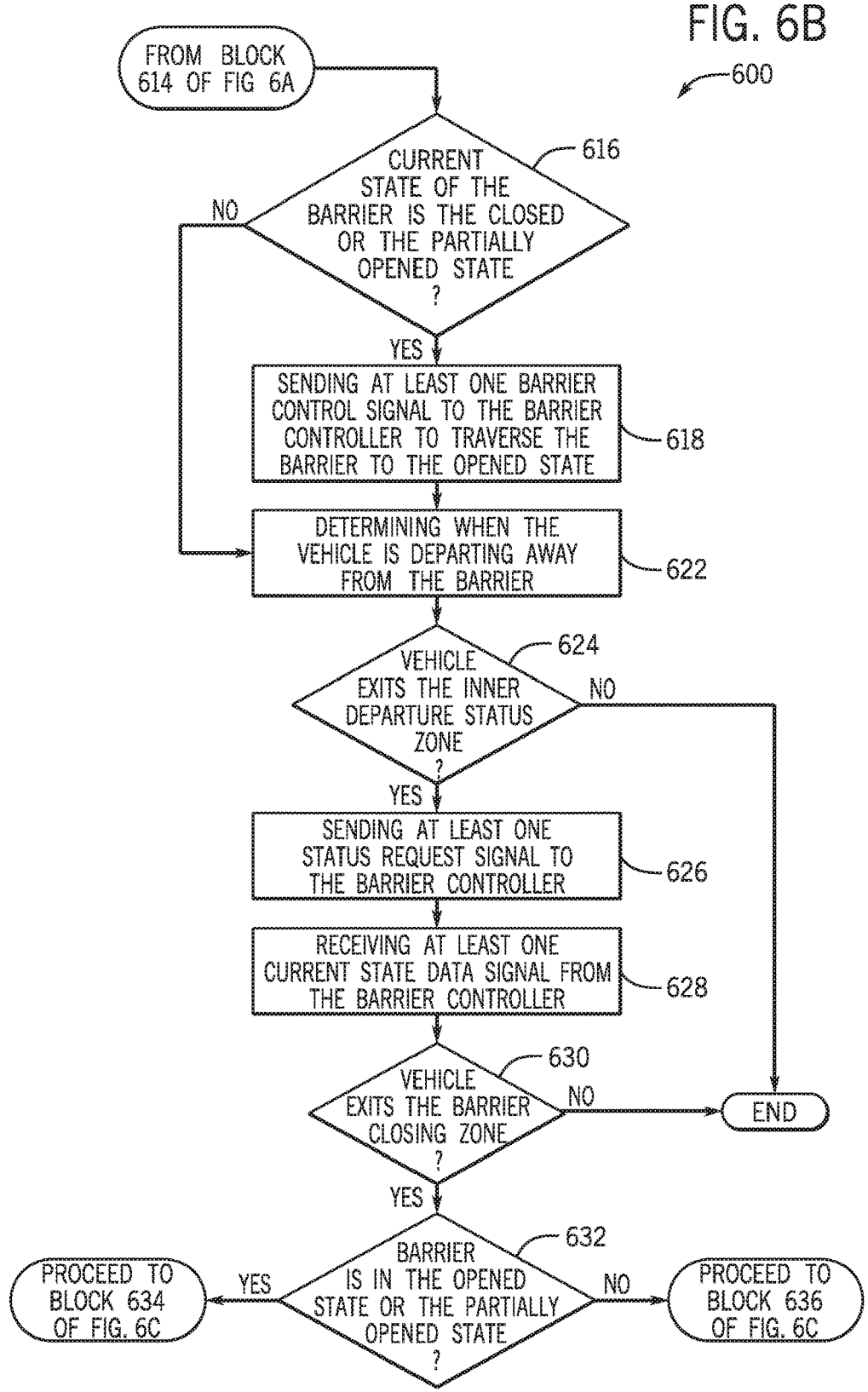
FIG. 6B is a process flow diagram of a second part of the method for automatically controlling movement of the barrier during a departure of the vehicle away from the barrier according to an exemplary embodiment.

FIG. 6B is a process flow diagram of a second part of the method 600 for automatically controlling movement of the barrier 104 during a departure of the vehicle 102 away from the barrier 104 according to an exemplary embodiment. FIG. 6B will be described with reference to the components of FIG. 1 though it is to be appreciated that the method 600 of FIG. 6B may be used with other systems and/or components. If it is determined that the vehicle 102 is parked within the area enclosed by the barrier 104 (at block 614), the method 600 may proceed to block 616, wherein the method 600 may include determining if the current state of the barrier 104 is the closed state or the partially opened state. Upon receiving the one or more current state data signals that include the current state of the barrier 104 (at block 612), the vehicle communication system 128 may communicate the current state of the barrier 104 to the barrier status determinant module 150. The barrier status determinant module 150 may responsively determine if the current state of the barrier 104 is in the closed state, the partially opened state, or the opened state.

If it is determined that the current state of the barrier 104 is the closed state or the partially opened state (at block 616), the method 600 may proceed to block 618, wherein the method 600 may include sending at least one barrier control signal to the barrier controller 108 to traverse the barrier 104 to the opened state. Upon the barrier status determinant module 150 determining that the current state of the barrier 104 is the closed state or the partially opened state (at block 616), the barrier status determinant module 150 may communicate respective data to the barrier control module 152. The barrier control module 152 may utilize the vehicle communication system 128 to send the one or more barrier control signals to the transceiver 140 to traverse the barrier 104 from the closed state or the partially opened state to the opened state to fully open the barrier 104 to allow the vehicle 102 to exit the area enclosed by the barrier 104.

In some embodiments, the barrier control module 152 may send the barrier control signal(s) upon the user actuating the battery/accessory state of the vehicle 102 prior to the enabling of the battery/ACC mode and/or the engine of the vehicle 102. In additional embodiments, the barrier control module 152 may send the signal(s) upon the engine of the vehicle 102 being enabled to ensure that the barrier 104 is not in the closed state when the engine of the vehicle 102 is enabled. As an illustrative example, when it is determined that the vehicle 102 is within the garage enclosed by the barrier 104, the application 106 ensures that the barrier 104 is opened to allow the vehicle 102 to exit from the garage to depart away from the driver's home that includes the garage and barrier 104.

The method 600 may proceed to block 622, wherein the method 600 may include determining when the vehicle 102 is departing from the barrier 104. As discussed above, the location determinant module 146 may communicate with the navigation system 132 to utilize the GPS 132a and the map database 132b to evaluate if the vehicle 102 is being driven away from geo-location associated with the barrier 104 after exiting the area enclosed by the barrier 104 that is in the opened state. If the navigation system 132 determines that a distance between the locational coordinates of the vehicle 102, as provided by the GPS 132a and the geo-location of the barrier 104 are increasing, the navigation system 132 may communicate respective data to the location determinant module 146. The location determinant module 146 may responsively determine that the vehicle 102 is departing away from the barrier 104.

The method 600 may proceed to block 624, wherein the method 600 may include determining if the vehicle 102 exits the inner departure status zone. In one embodiment, when the location determinant module 146 determines that the vehicle 102 is departing away from the barrier 104, the location determinant module 146 may communicate the location of the vehicle 102 and the traveling direction of the vehicle 102 to the zone determinant module 148. As discussed above, the zone determinant module 148 may determine the plurality of zones associated with the barrier 104 that specifically pertain to the departure of the vehicle 102 away from the barrier 104.

As discussed above, upon determining the inner departure status zone 402b (shown in FIG. 4), the zone determinant module 148 may populate the barrier profile associated with the barrier 104 with the plurality of GPS coordinates associated with portions the boundary 402a of the inner departure status zone 402b. In one embodiment, as the vehicle 102 is being driven, the location determinant module 146 may communicate with the navigation system 132 to continually determine the locational coordinates associated with the vehicle 102 as provided by the GPS 132a.

The location determinant module 146 may also access the barrier profile stored on the storage unit 116 and may communicate with the navigation system 132 to determine if the vehicle 102 is exiting any of the portions of the boundary 402a of the inner departure status zone 402b. More specifically, the location determinant module 146 may continually compare the locational coordinates of the vehicle 102 against the plurality of GPS coordinates associated with portions of the boundary 402a to determine if they overlap with one another. If it is determined that the overlapping of the locational coordinates of the vehicle 102 occurs with the plurality of GPS coordinates associated with portions of the boundary 402a, the location determinant module 146 may determine that the vehicle 102 exits the inner departure status zone 402b. For example, with reference to FIG. 4, if the vehicle 102 is being driven away from the barrier 104 (reversing away from the barrier 104 down the driveway 422), the vehicle 102 may exit the inner departure status zone 402b. In such a scenario, the location determinant module 146 may determine when the vehicle 102 exits the inner departure status zone 402b once the vehicle 102 crosses one of the portions of the boundary 402a.

If it is determined that the vehicle 102 exits the inner departure status zone 402b (at block 624), the method 600 may proceed to block 624, wherein the method 600 may include sending at least one status request signal to the barrier controller 108. In an exemplary embodiment, upon the location determinant module 146 determining that the vehicle 102 is crossing one of the portions of the boundary 402a to exit the static departing status zone 414b (at block 624), the location determinant module 146 may communicate respective data to the barrier status determinant module 150. The barrier status determinant module 150 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 150 may send the status request data signal(s) to determine if the barrier 104 is currently in the opened state, the closed state, or the partially opened state.

The method 600 may proceed to block 628, wherein the method 600 may include receiving at least one current state data signal from the barrier controller 108. As discussed above, upon determining the current state of the barrier 104, the barrier controller 108 may utilize the transceiver 140 to communicate the one or more current state data signals that include the current state of the barrier 104 as the opened state, the closed state, or the partially opened state to vehicle communication system 128. In one embodiment, the barrier status determinant module 150 may classify the current state as determined after the vehicle 102 has exited the area enclosed by the barrier 104 as the updated state of the barrier 104, since this state of the barrier 104 is updated since the initial state of the barrier 104 was previously received and determined (at block 612).

The method 600 may proceed to block 630, wherein the method 600 may include determining if the vehicle 102 exits the barrier closing zone. With reference to FIG. 4, upon the vehicle 102 exiting the inner departure status zone 402b, the vehicle 102 may continue to travel through the barrier closing zone 404b as the vehicle 102 continues to depart away from the barrier 104. As the vehicle 102 is traveling through the barrier closing zone 404b, the location determinant module 146 may access the barrier profile stored on the storage unit 116 and may communicate with the navigation system 132 to determine if the vehicle 102 is exiting (e.g., crossing) any of the portions of the boundary 404a of the barrier closing zone 404b. More specifically, the location determinant module 146 may continue to compare the locational coordinates of the vehicle 102 against the plurality of GPS coordinates associated with portions of the boundary 404a to determine if they overlap with one another. If it is determined that the overlapping of the locational coordinates of the vehicle 102 occurs with the plurality of GPS coordinates associated with portions of the boundary 404a, the barrier control module 152 determines that the vehicle 102 exits the barrier closing zone 404b.

If it is determined that the vehicle 102 exits the barrier closing zone (at block 630), the method 600 may proceed to block 632, wherein the method 600 may include determining if the barrier 104 is in the opened state or the partially opened state. Upon receiving the one or more current state data signals that include the current state of the barrier 104, the vehicle communication system 128 may communicate the current state of the barrier 104 to the barrier status determinant module 150. The barrier status determinant module 150 may responsively determine if the current state of the barrier 104 is in the opened state or the partially opened state. This determination may be made by the barrier status determinant module 150 to determine if the user manually actuated movement of the barrier 104 to close the barrier 104 as the vehicle 102 is departing away from the barrier 104 after exiting the area enclosed by the barrier 104.

FIG. 6C is a process flow diagram of a third part of the method 600 for automatically controlling movement of the barrier 104 during a departure of the vehicle 102 away from the barrier 104 according to an exemplary embodiment. FIG. 6C will be described with reference to the components of FIG. 1 though it is to be appreciated that the method 600 of FIG. 6C may be used with other systems and/or components. If it is determined that the barrier 104 is in the opened state of the partially opened state (at block 632 or block 620, as discussed above), the method 600 may proceed to block 634, wherein the method 600 may include sending at least one barrier control signal to the barrier controller 108 to traverse the barrier 104 to the closed state. In an exemplary embodiment, if the barrier control module 152 determines that the current state of the barrier 104 is the opened state (at block 620 or block 632), the barrier control module 152 may utilize the vehicle communication system 128 to send the one or more barrier control signals to the transceiver 140 to traverse the barrier 104 from the opened state to the closed state. Likewise, if the barrier control module 152 determines that the current state of the barrier 104 is the partially opened state (at block 620 or block 632), the barrier control module 152 may utilize the vehicle communication system 128 to send the one or more barrier control signals to the transceiver 140 to traverse the barrier 104 from the partially opened state to the (fully) closed state. The barrier controller 108 may evaluate the received barrier control signals and may responsively move the barrier 104 to traverse the barrier 104 from the opened state or partially opened state to the closed state.

The method 600 may proceed from blocks 620 or block 632, discussed above, upon determining that the current state of the barrier 104 is the closed state or from block 634, upon sending the signal to traverse the barrier 104 to the closed state to block 636, wherein the method 600 may determine if the vehicle 102 is located a predetermined distance from exiting the outer departure status zone 406b. As discussed above, the outer departure status zone 406b may provide the current status of the barrier 104 to the barrier status determinant module 150 at a last (i.e., latest) possible point in time in order to account for the speed of the vehicle 102 as it is departing away from the barrier 104 towards an area 412 outside of an RF transmission range between the vehicle communication system 128 and the transceiver 140. Stated differently, when the vehicle 102 is located at the predetermined distance from exiting the outer departure status zone 406b, the vehicle 102 may have an opportunity to complete RF communication immediately prior to the vehicle 102 being located outside of a RF communication range with the barrier controller 108.

In one embodiment, the location determinant module 146 may use the predetermined distance from exiting the zone 406b as a minimal distance to the boundary 406a of the outer departure status zone 406b that is representative of a last opportunity that the vehicle communication system 128 and the transceiver 140 have to send and receive RF signals (i.e., before the vehicle 102 exits the outer departure status zone 406b and enters the area 412). In other words, the predetermined distance may represent a distance within a location (s) of the outer departure status zone 406b and the boundary 406a that the vehicle 102 may be within the RF transmission range between the vehicle communication system 128 and the transceiver 140. Accordingly, based on data provided by the navigation system 132, the location determinant module 146 may access the barrier profile associated with the barrier 104 stored on the storage unit 116 and may store GPS coordinates associated with the location(s) that may include the predetermined distance.

In one or more embodiments, as the vehicle 102 exits the barrier closing zone 404b and travels through the outer departure status zone 406b, the location determinant module 146 may communicate with the navigation system 132 to determine if the vehicle 102 is located at the location(s) that are included at the predetermined distance from exiting the outer departure status zone 406b. The navigation system 132 may provide the location of the vehicle 102 within the outer departure status zone 406b and may determine when the vehicle 102 is located at the predetermined distance from exiting the outer departure status zone 406b.

If it is determined that the vehicle 102 is located at the predetermined distance from exiting the outer departure status zone 406b (at block 636), the method 600 may proceed to block 638, wherein the method 600 may include sending at least one status request signal to the barrier controller 108. In an exemplary embodiment, upon the location determinant module 146 determining that the vehicle 102 is located at the predetermined distance from exiting the outer departure status zone 406b, the location determinant module 146 may communicate respective data to the barrier status determinant module 150. The barrier status determinant module 150 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 150 may send the status request data signal(s) to determine if the barrier 104 has (fully) closed based on the sending of the at least one barrier control signal by the barrier control module 152 (at block 634).

The method 600 may proceed to block 640, wherein the method 600 may include receiving at least one current data signal from the barrier controller 108. As discussed above, upon determining the current state of the barrier 104, the barrier controller 108 may utilize the transceiver 140 to communicate the one or more current state data signals that include the current state of the barrier 104 as the closed state, the opened state, or the partially opened state to vehicle communication system 128. Since the current state of the barrier 104 is determined upon the vehicle 102 being determined to be located at the predetermined distance from exiting the outer departure zone that is representative of a last opportunity that the vehicle communication system 128 and the transceiver 140 have to send and receive RF signals (at block 636), the application 106 ensures that the current state of the barrier 104 is determined based on RF communication that occurs immediately prior to the vehicle 102 being located outside of the RF communication range with the barrier controller 108.

The method 600 may proceed to block 642, wherein the method 600 may include determining if the barrier 104 has traversed to the closed state. In an exemplary embodiment, upon receiving the one or more current state data signals, the vehicle communication system 128 may communicate respective data to the barrier status determinant module 150. The barrier status determinant module 150 may responsively determine if the barrier 104 has traversed to the closed state. This functionality may provide indication if the barrier 104 did in fact completely traverse to the (fully) closed state upon sending the at least one barrier control signal to the barrier controller 108 (at block 634). If it is determined that the barrier 104 has traversed to the closed state (at block 642), the barrier status determinant module 150 may determine that the barrier 104 had fully closed based on the at least one signal sent to the barrier controller 108 to traverse the barrier 104 to the closed state (at block 634). The method 600 may proceed to block 648, wherein the method 600 may include presenting the current state of the barrier 104 within the vehicle 102, as described in more detail below.

If it is determined that the barrier 104 has not traversed to the closed state (at block 642), the method 600 may proceed to block 644, wherein the method 600 may include determining if the vehicle 102 is still located within a RF transmission range of the barrier 104. In an exemplary embodiment, the location determinant module 146 may communicate with the navigation system 132 to determine if the vehicle 102 is (still) being driven within the outer departure status zone 406b or if the vehicle 102 located in the area 412 outside of an RF transmission range between the vehicle communication system 128 and the transceiver 140. More specifically, the location determinant module 146 may continue to compare the locational coordinates of the vehicle 102 against the plurality of GPS coordinates associated with portions of the boundary 406a to determine if they overlap with one another. If it is determined that the overlapping of the locational coordinates of the vehicle 102 occurs with the plurality of GPS coordinates associated with portions of the boundary 406a, the barrier control module 152 determines that the vehicle 102 exits the outer departure status zone 406b and enters the area 412 outside of an RF transmission range between the vehicle communication system 128 and the transceiver 140.

If it is determined that the vehicle 102 is not still located within the RF transmission range of the barrier 104 (at block 642), the method 600 may proceed to block 644, wherein the method 600 may include communicating with the external server infrastructure via the internet cloud to determine the current state of the barrier 104. As discussed above, upon controlling the movement of the barrier 104 and traversing the barrier 104 (e.g., from the opened state to the closed state), the barrier controller 108 may access the internet cloud 126 via the Wi-Fi antenna 142 to update and store the (updated) current status of the barrier 104 within the barrier controller data repository on the external server infrastructure 144.

In one embodiment, when it is determined that the vehicle 102 is no longer located within the outer departure status zone 406b (as determined at block 644) and that the barrier 104 has not traversed to the closed state (as determined at block 642), the barrier status determinant module 150 may communicate respective data to the TCU 120. The TCU 120 may responsively communicate with the internet cloud 126 to access the external server infrastructure 144. The TCU 120 may additionally access the barrier controller data repository to retrieve the stored current status of the barrier 104 to determine the current status of the barrier 104 (as communicated by the barrier controller 108 and stored on the external server infrastructure 144). This functionality may ensure that the barrier status determinant module 150 determines a follow-up current status of the barrier 104 related to the state of the barrier 104. In particular, the follow-up current status may provide an indication of if the barrier 104 did in fact completely traverse to the (fully) closed state. Alternatively, the follow-up current state may provide an indication if the barrier 104 is still in the process of being closed or if there may have been some external factor (e.g., mechanical issue, environmental issue) that may have hindered the closure of the barrier 104.

Upon determining that the barrier 104 has traversed to the closed state (at block 642) or upon communicating with the external server infrastructure 144 to determine the current state of the barrier 104 (at block 646), the method 600 may proceed to block 648, wherein the method 600 may include presenting the current state of the barrier 104 within the vehicle 102. In one embodiment, upon evaluating the current state of the barrier 104, the barrier status determinant module 150 may communicate respective data to the barrier status presentation module 154. As discussed above, the barrier status presentation module 154 may be utilized to communicate with the infotainment system 118 to present the barrier status user interface.

The barrier status user interface may present the current status of the barrier 104 to the user. Accordingly, as the vehicle 102 is departing away from the barrier 104, the barrier status user interface may inform the user if the barrier 104 is in the closed state based on the operation of the barrier control module 152 or if the barrier 104 is still in the opened state or partially opened state (e.g., based on some external factor that may have occurred). In one embodiment, if the infotainment system 118 has not yet booted up, the barrier status presentation module 154 may provide the current state of the barrier 104 through tactile feedback or an audible alert that may be provided to the user via the head unit 112 prior to the barrier status user interface being presented through the display unit 114 (upon boot up of the infotainment system 118).

Figure 7:
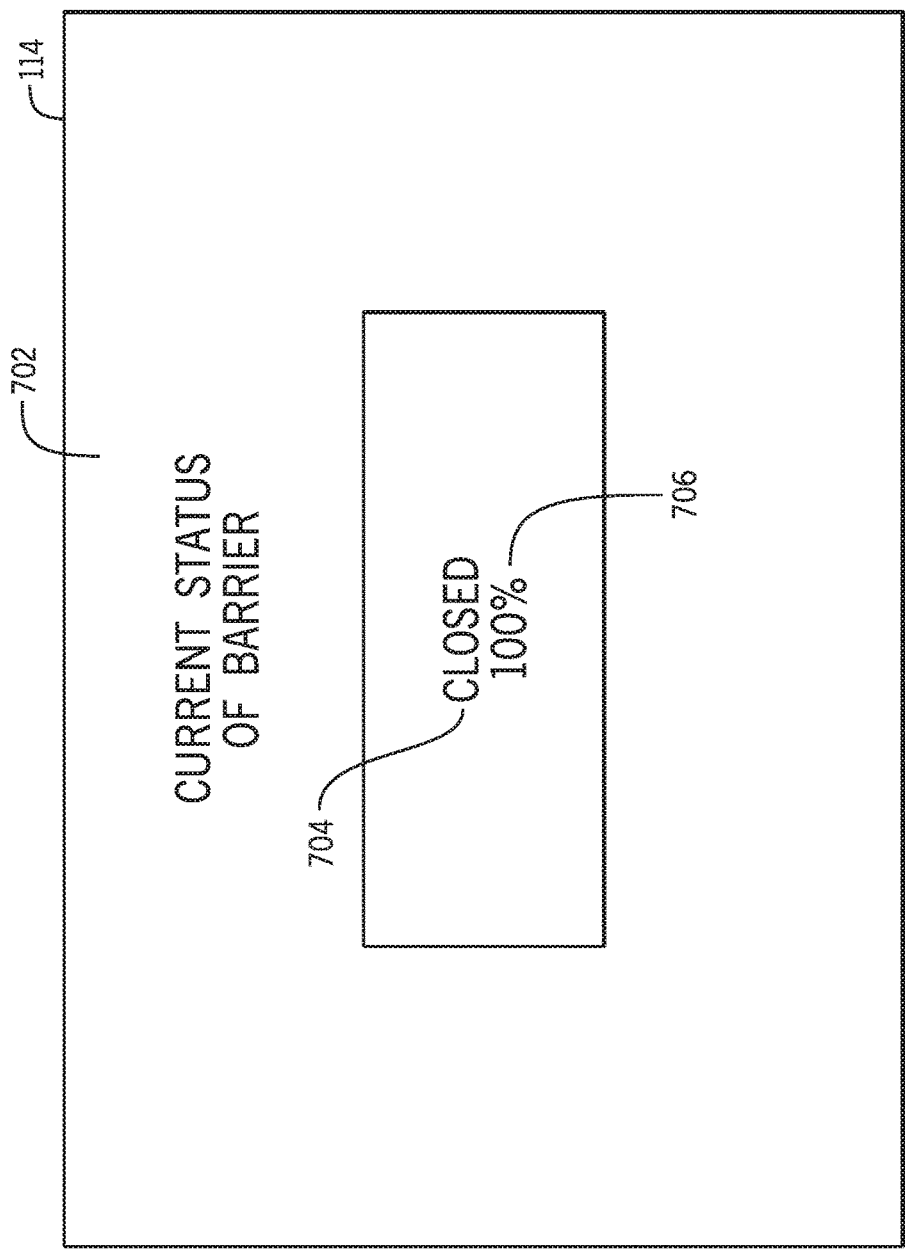
FIG. 7 is an illustrative example of the barrier status user interface presented on the display unit of the vehicle according to an exemplary embodiment.

FIG. 7 is an illustrative example of the barrier status user interface 702 presented on the display unit 114 of the vehicle 102 according to an exemplary embodiment. As shown, the barrier status user interface 702 may include the current status of the barrier 704 upon the barrier 104 being traversed to the closed state. Additionally, the barrier status user interface 702 may include the barrier traversing level 706 that indicates the opening/closing level of the barrier 104. As an alternate illustrative example, if the barrier 104 is in being moved from the opened state to the closed state, the current state of the barrier 704 may be presented as "Closing" and the barrier traversing level 706 may be presented as less than 100% (e.g., 78%) as the barrier 104 is being traversed to the closed state.

Figure 8:
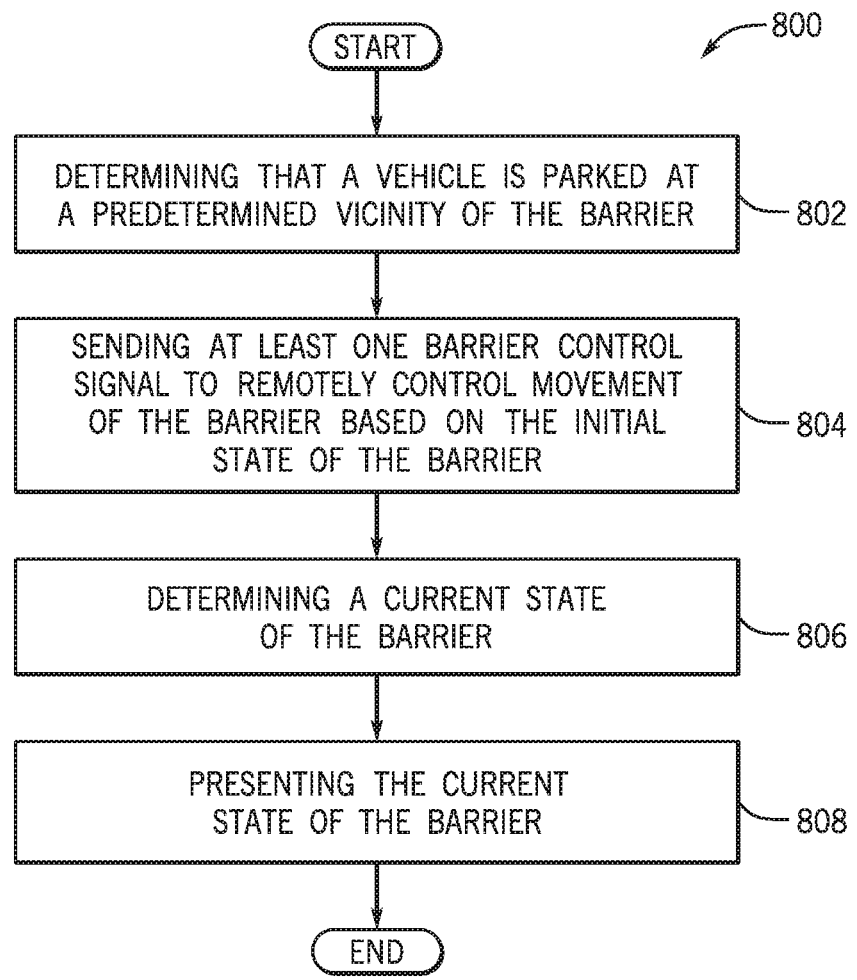
FIG. 8 is a process flow diagram of a method for automatically controlling movement of the barrier according to an exemplary embodiment.

FIG. 8 is a process flow diagram of a method 800 for remotely controlling and determining a status of a barrier 104 according to an exemplary embodiment. FIG. 8 will be described with reference to the components of FIG. 1 though it is to be appreciated that the method of FIG. 8 may be used with other systems and/or components. The method 800 may begin at block 802, wherein the method 800 may include determining that a vehicle 102 is parked at a predetermined vicinity of the barrier 104. In one embodiment, an initial state of the barrier 104 is determined upon determining that the vehicle 102 is parked at the predetermined vicinity of the barrier 104.

The method 800 may proceed to block 804, wherein the method 800 may include sending at least one barrier control signal to remotely control movement of the barrier 104 based on the initial state of the barrier 104. In one embodiment, the at least one barrier control signal is sent to the barrier controller 108 associated with the barrier 104 to traverse the barrier 104 to a closed state when it is determined that the initial state of the barrier 104 is the opened state or the partially opened state.

The method 800 may proceed to block 806, wherein the method 800 may include determining a current state of the barrier 104, wherein the current state of the barrier 104 is determined based on at least one: RF communication that occurs immediately prior to the vehicle 102 being located outside of a RF communication range with the barrier controller 108, and a wireless internet communication that occurs upon the vehicle 102 being located outside of the RF communication range with the barrier controller 108.

The method 800 may proceed to block 808, wherein the method 800 may include presenting the current state of the barrier 104. In one embodiment, the current state of the barrier 104 is presented to display if the current state of the barrier 104 is the closed state based on the at least one barrier control signal sent to remotely control movement of the barrier 104.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for remotely controlling and determining a status of a barrier, comprising:
   determining that a vehicle is parked at a predetermined vicinity of the barrier, wherein an initial state of the barrier is determined upon determining that the vehicle is parked at the predetermined vicinity of the barrier;
   determining that the vehicle is departing away from the barrier and sending at least one barrier control signal to remotely control movement of the barrier, wherein the at least one barrier control signal is sent to a barrier controller associated with the barrier to traverse the barrier to a closed state when it is determined that the initial state of the barrier is an opened state or a partially opened state;
   determining a current state of the barrier, wherein the current state of the barrier is determined based on a wireless internet communication that occurs upon determining that the barrier has not traversed to the closed state based on RF communication that occurs immediately prior to the vehicle being located outside of a RF communication range with the barrier controller, wherein the wireless internet communication occurs upon determining that the vehicle is located outside of the RF communication range with the barrier controller; and
   presenting the current state of the barrier, wherein the current state of the barrier is presented to display if the current state of the barrier is the closed state based on the at least one barrier control signal sent to remotely control movement of the barrier.

2. The computer-implemented method of claim 1, wherein the current state of the barrier is determined based on RF communication that occurs immediately prior to the vehicle being located outside of a RF communication range with the barrier controller.

3. The computer-implemented method of claim 1, wherein determining if the vehicle is parked at the predetermined vicinity of the barrier includes creating and storing a data flag that indicates that the vehicle is parked within the predetermined vicinity of the barrier, wherein the data flag is populated within a barrier profile that is associated with the barrier and stored on a storage of the vehicle.

4. The computer-implemented method of claim 3, wherein determining if the vehicle is parked at the predetermined vicinity of the barrier includes determining that a battery/ACC mode of the vehicle is activated, wherein it is determined if the vehicle is parked within the predetermined vicinity of the barrier if the data flag is populated within the barrier profile upon retrieving the data flag from the barrier profile.

5. The computer-implemented method of claim 1, further including determining that the vehicle is parked within an area enclosed by the barrier and determining the initial state of the barrier, wherein at least one barrier control signal is sent to the barrier control to traverse the barrier to the opened state when the initial state of the barrier is determined to be in the closed state or the partially opened state.

6. The computer-implemented method of claim 5, further including determining an updated state of the barrier upon determining that the vehicle is departing away from the barrier and that the vehicle exits an inner departure status zone that is located at a predetermined distance of the barrier.

7. The computer-implemented method of claim 6, wherein sending the at least one barrier control signal to remotely control movement of the barrier includes sending the at least one barrier control signal to the barrier controller to traverse the barrier to the closed state when it is determined that the updated state of the barrier is the opened state or the partially opened state.

8. The computer-implemented method of claim 1, wherein determining the current state of the barrier includes determining that the vehicle is located a predetermined distance from exiting an outer departure status zone, wherein the outer departure status zone is located at a predetermined distance from the barrier and is utilized to provide the current status of the barrier at a last possible point in time prior to the vehicle being located outside of the RF communication range with the barrier controller as the vehicle is departing away from the barrier.

9. The computer-implemented method of claim 8, wherein determining the current state of the barrier includes determining that the current state of the barrier is the opened state or the partially opened state before the vehicle exits the outer departure status zone, wherein the wireless internet communication occurs between the vehicle and an external server infrastructure to determine the current state of the barrier upon determining that the vehicle has exited the outer departure zone and is located outside of the RF communication range with the barrier controller.

10. A system for remotely controlling and determining a status of a barrier, comprising:
   a memory storing instructions when executed by a processor cause the processor to:
      determine that a vehicle is parked at a predetermined vicinity of the barrier, wherein an initial state of the barrier is determined upon determining that the vehicle is parked at the predetermined vicinity of the barrier;

determine that the vehicle is departing away from the barrier and send at least one barrier control signal to remotely control movement of the barrier, wherein the at least one barrier control signal is sent to a barrier controller associated with the barrier to traverse the barrier to a closed state when it is determined that the initial state of the barrier is an opened state or a partially opened state;

determine a current state of the barrier, wherein the current state of the barrier is determined based on a wireless internet communication that occurs upon determining that the barrier has not traversed to the closed state based on RF communication that occurs immediately prior to the vehicle being located outside of a RF communication range with the barrier controller, wherein the wireless internet communication occurs upon determining that the vehicle is located outside of the RF communication range with the barrier controller; and present the current state of the barrier, wherein the current state of the barrier is presented to display if the current state of the barrier is the closed state based on the at least one barrier control signal sent to remotely control movement of the barrier.

11. The system of claim 10, wherein the current state of the barrier is determined based on RF communication that occurs immediately prior to the vehicle being located outside of a RF communication range with the barrier controller.

12. The system of claim 10, wherein determining if the vehicle is parked at the predetermined vicinity of the barrier includes creating and storing a data flag that indicates that the vehicle is parked within the predetermined vicinity of the barrier, wherein the data flag is populated within a barrier profile that is associated with the barrier and stored on a storage of the vehicle.

13. The system of claim 12, wherein determining if the vehicle is parked at the predetermined vicinity of the barrier includes determining that a battery/ACC mode of the vehicle is activated, wherein it is determined if the vehicle is parked within the predetermined vicinity of the barrier if the data flag is populated within the barrier profile upon retrieving the data flag from the barrier profile.

14. The system of claim 10, further including determining that the vehicle is parked within an area enclosed by the barrier and determining the initial state of the barrier, wherein at least one barrier control signal is sent to the barrier control to traverse the barrier to the opened state when the initial state of the barrier is determined to be in the closed state or the partially opened state.

15. The system of claim 14, further including determining an updated state of the barrier upon determining that the vehicle is departing away from the barrier and that the vehicle exits an inner departure status zone that is located at a predetermined distance of the barrier.

16. The system of claim 15, wherein sending the at least one barrier control signal to remotely control movement of the barrier includes sending the at least one barrier control signal to the barrier controller to traverse the barrier to the closed state when it is determined that the updated state of the barrier is the opened state or the partially opened state.

17. The system of claim 10, wherein determining the current state of the barrier includes determining that the vehicle is located a predetermined distance from exiting an outer departure status zone, wherein the outer departure status zone is located at a predetermined distance from the barrier and is utilized to provide the current status of the barrier at a last possible point in time prior to the vehicle being located outside of the RF communication range with the barrier controller as the vehicle is departing away from the barrier.

18. The system of claim 17, wherein determining the current state of the barrier includes determining that the current state of the barrier is the opened state or the partially opened state before the vehicle exits the outer departure status zone, wherein the wireless internet communication occurs between the vehicle and an external server infrastructure to determine the current state of the barrier upon determining that the vehicle has exited the outer departure zone and is located outside of the RF communication range with the barrier controller.

19. A non-transitory computer readable storage medium storing instructions that when executed by a computer, which includes a processor, perform a method, the method comprising:

determining that a vehicle is parked at a predetermined vicinity of a barrier, wherein an initial state of the barrier is determined upon determining that the vehicle is parked at the predetermined vicinity of the barrier;

determining that the vehicle is departing away from the barrier and sending at least one barrier control signal to remotely control movement of the barrier, wherein the at least one barrier control signal is sent to a barrier controller associated with the barrier to traverse the barrier to a closed state when it is determined that the initial state of the barrier is an opened state or a partially opened state;

determining a current state of the barrier, wherein the current state of the barrier is determined based on a wireless internet communication that occurs upon determining that the barrier has not traversed to the closed state based on RF communication that occurs immediately prior to the vehicle being located outside of a RF communication range with the barrier controller, wherein the wireless internet communication occurs upon determining that the vehicle is located outside of the RF communication range with the barrier controller; and presenting the current state of the barrier, wherein the current state of the barrier is presented to display if the current state of the barrier is the closed state based on the at least one barrier control signal sent to remotely control movement of the barrier.

20. The non-transitory computer readable storage medium of claim 19, wherein determining the current state of the barrier includes determining that the vehicle is located a predetermined distance from exiting an outer departure status zone, wherein the outer departure status zone is located at a predetermined distance from the barrier and is utilized to provide the current status of the barrier at a last possible point in time prior to the vehicle being located outside of the RF communication range with the barrier controller as the vehicle is departing away from the barrier.

* * * * *